US008373899B2

(12) United States Patent
Kita et al.

(10) Patent No.: US 8,373,899 B2

(45) **Date of Patent: *Feb. 12, 2013**

(54) COLOR IMAGE FORMING APPARATUS AND COLOR ADJUSTMENT METHOD

(75) Inventors: Hiroshi Kita, Mishima (JP); Kiyoto Toyoizumi, Susono (JP); Kenichi Iida, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/431,868

(22) Filed: Mar. 27, 2012

(65) Prior Publication Data

US 2012/0236338 A1 Sep. 20, 2012

Related U.S. Application Data

(63) Continuation of application No. 12/209,994, filed on Sep. 12, 2008, now Pat. No. 8,144,365.

(30) Foreign Application Priority Data

Sep. 14, 2007 (JP) ................................ 2007-239307

(51) Int. Cl.

*H04N 1/60* (2006.01)
*H04N 1/46* (2006.01)

(52) U.S. Cl. ........................................ 358/1.9; 358/504

(58) Field of Classification Search .................. 358/1.9, 358/504; 347/19, 43; 399/49

See application file for complete search history.

(56) References Cited

U.S. PATENT DOCUMENTS 6,450,606 B1 * 9/2002 Kato et al. ...................... 347/19

FOREIGN PATENT DOCUMENTS

JP 2003-107830 A 4/2003
JP 2004-320190 A 11/2004
JP 2006-035645 A 2/2006

* cited by examiner

*Primary Examiner* — Charlotte M Baker

(74) *Attorney, Agent, or Firm* — Canon U.S.A., Inc. IP Division

(57) ABSTRACT

A color image forming apparatus specifies print mode (media), forms a test image based on gradation levels of a plurality of colors according to the specified print mode (media), and detects the test image with a color sensor. The color image forming apparatus performs gray axis correction calculation based on detection result obtained by the color sensor.

6 Claims, 30 Drawing Sheets

FIG.10

| | PATCH NO. | C GRADATION LEVEL | M GRADATION LEVEL | Y GRADATION LEVEL | K GRADATION LEVEL |
|---|---|---|---|---|---|
| FIRST SET | (1) | C00 (=C0-α) | M00 (=M0) | Y00 (=Y0) | 0 |
| | (2) | C01 (=C0+α) | M01 (=M0) | Y01 (=Y0) | 0 |
| | (3) | C02 (=C0) | M02 (=M0-α) | Y02 (=Y0) | 0 |
| | (4) | C03 (=C0) | M03 (=M0+α) | Y03 (=Y0) | 0 |
| | (5) | C04 (=C0) | M04 (=M0) | Y04 (=Y0-α) | 0 |
| | (6) | C05 (=C0) | M05 (=M0) | Y05 (=Y0+α) | 0 |
| | (7) | 0 | 0 | 0 | K0 |
| SECOND SET | (1) | C10 | M10 | Y10 | 0 |
| | (2) | C11 | M11 | Y11 | 0 |
| | (3) | C12 | M12 | Y12 | 0 |
| | (4) | C13 | M13 | Y13 | 0 |
| | (5) | C14 | M14 | Y14 | 0 |
| | (6) | C15 | M15 | Y15 | 0 |
| | (7) | 0 | 0 | 0 | K1 |
| THIRD SET | (1) | C20 | M20 | Y20 | 0 |
| | (2) | C21 | M21 | Y21 | 0 |
| | (3) | C22 | M22 | Y22 | 0 |
| | (4) | C23 | M23 | Y23 | 0 |
| | (5) | C24 | M24 | Y24 | 0 |
| | (6) | C25 | M25 | Y25 | 0 |
| | (7) | 0 | 0 | 0 | K2 |

FIG.12

| PATCH NO. | EXPLANATORY VARIABLE C | EXPLANATORY VARIABLE M | EXPLANATORY VARIABLE Y | CRITERION VARIABLE a* |
|---|---|---|---|---|
| (1) | C00 | M00 | Y00 | a00 |
| (2) | C01 | M01 | Y01 | a01 |
| (3) | C02 | M02 | Y02 | a02 |
| (4) | C03 | M03 | Y03 | a03 |
| (5) | C04 | M04 | Y04 | a04 |
| (6) | C05 | M05 | Y05 | a05 |

FIG.18

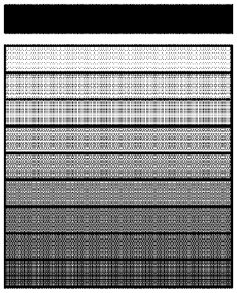

REFERENCE 1

| | C INPUT DATA | M INPUT DATA | Y INPUT DATA | K INPUT DATA |
|---|---|---|---|---|
| Bk1 | 0 | 0 | 0 | K1 |
| Bk2 | 0 | 0 | 0 | K2 |
| Bk3 | 0 | 0 | 0 | K3 |
| Bk4 | 0 | 0 | 0 | K4 |
| Bk5 | 0 | 0 | 0 | K5 |
| Bk6 | 0 | 0 | 0 | K6 |
| Bk7 | 0 | 0 | 0 | K7 |
| Bk8 | 0 | 0 | 0 | K8 |
| Bk9 | 0 | 0 | 0 | K9 |

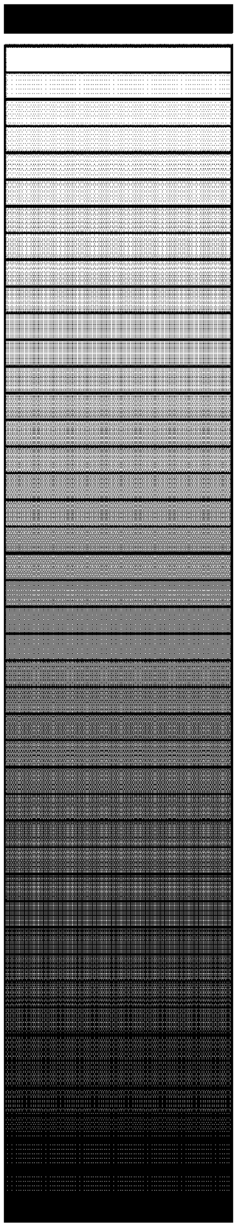

REFERENCE 2

| | | | | |
|---|---|---|---|---|
| CMY1 | C1 | M1 | Y1 | 0 |
| CMY2 | C2 | M2 | Y2 | 1 |
| CMY3 | C3 | M3 | Y3 | 2 |
| CMY4 | C4 | M4 | Y4 | 3 |
| CMY5 | C5 | M5 | Y5 | 4 |
| CMY6 | C6 | M6 | Y6 | 5 |
| CMY7 | C7 | M7 | Y7 | 6 |
| CMY8 | C8 | M8 | Y8 | 7 |
| CMY9 | C9 | M9 | Y9 | 8 |
| CMY10 | C10 | M10 | Y10 | 9 |
| CMY11 | C11 | M11 | Y11 | 10 |
| CMY12 | C12 | M12 | Y12 | 11 |
| CMY13 | C13 | M13 | Y13 | 12 |
| CMY14 | C14 | M14 | Y14 | 13 |
| CMY15 | C15 | M15 | Y15 | 14 |
| CMY16 | C16 | M16 | Y16 | 15 |
| CMY17 | C17 | M17 | Y17 | 16 |
| CMY18 | C18 | M18 | Y18 | 17 |
| CMY19 | C19 | M19 | Y19 | 18 |
| CMY20 | C20 | M20 | Y20 | 19 |
| CMY21 | C21 | M21 | Y21 | 20 |
| CMY22 | C22 | M22 | Y22 | 21 |
| CMY23 | C23 | M23 | Y23 | 22 |
| CMY24 | C24 | M24 | Y24 | 23 |
| CMY25 | C25 | M25 | Y25 | 24 |
| CMY26 | C26 | M26 | Y26 | 25 |
| CMY27 | C27 | M27 | Y27 | 26 |
| CMY28 | C28 | M28 | Y28 | 27 |
| CMY29 | C29 | M29 | Y29 | 28 |
| CMY30 | C30 | M30 | Y30 | 29 |
| CMY31 | C31 | M31 | Y31 | 30 |
| CMY32 | C32 | M32 | Y32 | 31 |
| CMY33 | C33 | M33 | Y33 | 32 |
| CMY34 | C34 | M34 | Y34 | 33 |
| CMY35 | C35 | M35 | Y35 | 34 |
| CMY36 | C36 | M36 | Y36 | 35 |
| CMY37 | C37 | M37 | Y37 | 36 |
| CMY38 | C38 | M38 | Y38 | 37 |
| CMY39 | C39 | M39 | Y39 | 38 |
| CMY40 | C40 | M40 | Y40 | 39 |
| CMY41 | C41 | M41 | Y41 | 40 |
| CMY42 | C42 | M42 | Y42 | 41 |
| CMY43 | C43 | M43 | Y43 | 42 |
| CMY44 | C44 | M44 | Y44 | 43 |

FIG.22A

| TYPE | CORRESPONDING PRINT MODE |
|---|---|
| TYPE A | PLAIN PAPER, THIN PAPER |
| TYPE B | GLOSSY PAPER, THICK PAPER |

FIG.22B

| TYPE A | C GRADATION LEVEL | M GRADATION LEVEL | Y GRADATION LEVEL |
|---|---|---|---|
| FIRST CORRECTED GRADATION | C0_A | M0_A | Y0_A |
| SECOND CORRECTED GRADATION | C1_A | M1_A | Y1_A |
| THIRD CORRECTED GRADATION | C2_A | M2_A | Y2_A |
| FOURTH CORRECTED GRADATION | C3_A | M3_A | Y3_A |
| FIFTH CORRECTED GRADATION | C4_A | M4_A | Y4_A |
| SIXTH CORRECTED GRADATION | C5_A | M5_A | Y5_A |
| SEVENTH CORRECTED GRADATION | C6_A | M6_A | Y6_A |
| EIGHTH CORRECTED GRADATION | C7_A | M7_A | Y7_A |

FIG.22C

| TYPE B | C GRADATION LEVEL | M GRADATION LEVEL | Y GRADATION LEVEL |
|---|---|---|---|
| FIRST CORRECTED GRADATION | C0_B | M0_B | Y0_B |
| SECOND CORRECTED GRADATION | C1_B | M1_B | Y1_B |
| THIRD CORRECTED GRADATION | C2_B | M2_B | Y2_B |
| FOURTH CORRECTED GRADATION | C3_B | M3_B | Y3_B |
| FIFTH CORRECTED GRADATION | C4_B | M4_B | Y4_B |
| SIXTH CORRECTED GRADATION | C5_B | M5_B | Y5_B |
| SEVENTH CORRECTED GRADATION | C6_B | M6_B | Y6_B |
| EIGHTH CORRECTED GRADATION | C7_B | M7_B | Y7_B |

FIG.24

| NO. | CONDITION |
| --- | --- |
| 1 | NON-EXECUTION OF GRAY AXIS CORRECTION CONTROL |
| 2 | ELAPSE OF PREDETERMINED TIME AFTER LAST GRAY AXIS CORRECTION CONTROL |
| 3 | REPLACEMENT OF PARTS FOR IMAGE FORMING APPARATUS AFTER LAST GRAY AXIS CORRECTION CONTROL |

FIG.30

| PAPER TYPE | IMAGE SIZE OF PATCH |
|---|---|
| ROUGH PAPER | 18 mm |
| PLAIN PAPER | 12 mm |
| COATED PAPER | 6 mm |

| PAPER SIZE / GRAMMAGE | LEDGER PORTRAIT | LETTER PORTRAIT | A4 LANDSCAPE |
|---|---|---|---|
| | A3 PORTRAIT | A4 PORTRAIT | LTR LANDSCAPE |
| LESS THAN 160 g/m$^2$ | 360 mm | 252 mm | 180 mm |
| 160 g/m$^2$ OR GREATER | 324 mm | 216 mm | 144 mm |

COLOR IMAGE FORMING APPARATUS AND COLOR ADJUSTMENT METHOD

CROSS-REFERENCE TO RELATED APPLICATIONS

This application is a Continuation of U.S. application Ser. No. 12/209,994, filed Sep. 12, 2008, which claims priority from Japanese Patent Application No. 2007-239307 filed Sep. 14, 2007, which are hereby incorporated by reference herein in their entireties.

BACKGROUND OF THE INVENTION

1. Field of the Invention

The present invention relates to a color image forming apparatus, which forms a color image based on an image signal and adjusts color of the color image.

2. Description of the Related Art

In recent years, in electrophotographic or inkjet color image forming apparatuses, such as color printers and color copying machines, an output image of higher image quality has been demanded. In general, stability in density and gradation of images has a significant impact on perceptions of image quality as judged by humans. To assure constant gradation-density characteristics irrespective of variations in the apparatus, conventional density control ("monochromatic control") includes forming patches of respective color toners on an intermediate transfer member and detecting the density of each patch with an unfixed toner density detection sensor (density sensor).

In this case, stable images can be obtained by performing density control by reflecting detected density information, as feedback, to process conditions (e.g., exposure amount conditions and development bias conditions) serving as image forming conditions.

However, "monochromatic control" (i.e., density control using an unfixed toner density detection sensor) includes formation and detection of patches on an intermediate transfer member or a photosensitive drum, without considering any changes in image color balance when the image is later transferred and fixed on a transfer material. The color balance also changes depending on the efficiency in transferring toner images onto a transfer material or conditions in a fixing process applying heat and pressure to toner images. The monochromatic control cannot correct such changes in color balance.

Hence, another conventional method includes providing a density or chromaticity sensor (hereinafter, referred to as "color sensor") capable of detecting the density of monochromatic toner images or the chromaticity of full-color images transferred and fixed on a transfer material, forming color toner patches on the transfer material, and detecting the density or chromaticity of the patches with the color sensor to control the density or chromaticity. The method includes reflecting the detected density or chromaticity information, as feedback, to process conditions (exposure amount, process conditions, lookup tables, etc.) and performing density or chromaticity control on a final output image formed on the transfer material.

In general, a color sensor includes a light source (light-emitting element) capable of emitting red (R) light, green (G) light, and blue (B) light, and is configured to identify C, M, Y, and K colors or detect density or chromaticity of each color. For example, the light-emitting element includes a light source that emits white (W) light, on which three types of filters of red (R), green (G), and blue (B), which are different in spectral transmittance, are formed. The color sensor can identify C, M, Y, and K colors and detect the density of each color based on three different outputs (e.g., RGB outputs) obtained by the light-emitting element. The RGB outputs are subjected to linear conversion or lookup table (LUT) conversion to obtain chromaticity expressed in a general color system of L*a*b* or XYZ. In addition, the word "chromaticity" in the present specification is an all-inclusive term for quantitatively representing color. Instead of the word of "chromaticity", it can be also described as "color information" or "color value". Further, "chromaticity" can be described merely as "color".

The color sensor, when used to detect the absolute density (or absolute chromaticity) of a patch, requires a white reference board usable to correct sensor output or a comparable member whose absolute density (or chromaticity) value is known. The first reason to use such a reference member is necessity of correcting dispersion in spectral characteristics of sensor elements (e.g., the light-emitting element and the light-sensitive element). The second reason is variations in sensor output due to aging of the sensor elements (e.g., the light-emitting element and the light-sensitive element) or ambient temperature change. The third reason is reduction in sensor output due to paper dust, toner, and ink deposited on a sensor surface when many transfer materials pass by the sensor in ordinary printing operations. However, the white reference board (i.e., the reference member used for sensor output correction) is expensive and cannot be used anymore if a board surface is soiled by paper dust, toner, or ink.

Hence, another conventional method includes detecting a process gray patch formed by cyan, magenta, and yellow colors and a monochromatic gray patch formed by black color with a color sensor and comparing chromaticity (L*a*b*, L*c*h*, or XYZ) of detected patches. The color of a gray patch formed by black toner usable for electrophotographic printers or black ink usable for inkjet printers is achromatic. Hence, the method includes forming a gray patch of black color as a reference patch every time the density or chromaticity control is performed, and performing correction to match the process gray with the color of the reference patch to obtain a process gray of achromatic color, without using any reference required for sensor output correction (hereinafter, referred to as "gray axis correction control").

The gray axis correction control does not require preparation of high resolution filters as well as a sensor output correction reference. Therefore, the gray axis correction control can be easily applied to a printer. Furthermore, if the gray balance of cyan, magenta, and yellow is inappropriate, problems such as "gray color (i.e., color most sensitive to human eyes) looks like other color" and "misregistration in tint of a chromatic color" may occur. In this respect, adjusting the process gray to achromatic color and obtaining proper gray balance is effective to solve the above-described problems.

In view of the above-described problems, as discussed in Japanese Patent Application Laid-Open No. 2003-107830, a conventional method obtains an optimum ratio of cyan, magenta, and yellow that can accurately realize a process gray of achromatic color based on a chromaticity value detected by a color sensor. The method includes forming patches by adjusting densities of cyan, magenta, and yellow colors constituting a process gray to attain chromaticity similar to that of a target black.

Furthermore, the method includes calculating an optimum ratio of gradation levels of cyan, magenta, and yellow colors constituting a process gray closest to the chromaticity of the target black, based on chromaticity information detected by the color sensor, using linear interpolation or multiple regression calculation. However, an experimental result revealed that the conventional method could not obtain proper gray balance due to differences in the type of transfer material (plain paper, glossy paper, etc.) and the type of print mode.

SUMMARY OF THE INVENTION

Exemplary embodiments of the present invention are directed to an image forming apparatus and color adjustment method for obtaining adequate density and color irrespective of the type of transfer material or image forming conditions (e.g., print mode).

According to an aspect of the present invention, a color image forming apparatus includes a forming unit configured to form a plurality of mixed color patches that are different in a combination of gradation levels of a plurality of colors, a detector configured to detect color of the plurality of mixed color patches fixed on a transfer material by the forming unit, a calculator configured to obtain the gradation levels of the plurality of colors forming the mixed color patches based on the detected color, and a specifying unit configured to specify an image forming condition related with a print mode or a type of the transfer material. The forming unit forms the mixed color patches based on a first combination of gradation levels if the image forming condition specified by the specifying unit is a first image forming condition and the forming unit forms the mixed color patches based on a second combination of gradation levels if the image forming condition specified by the specifying unit is a second image forming condition.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 10 illustrates example test image data used for gray axis correction control.

FIG. 12 illustrates example data sets used for multiple regression calculation in the gray axis correction control.

FIG. 18 illustrates another example test image for gray axis correction control of a color image forming apparatus.

FIGS. 22A through 22C illustrate example print mode (media type)-patch (gradation) tables.

FIG. 24 illustrates example determination conditions in the flowchart illustrated in FIG. 23.

FIG. 30 illustrates an example table, which can be referred to when the test image illustrated in FIG. 29 is formed.

DETAILED DESCRIPTION OF THE EMBODIMENTS

Figure 1:
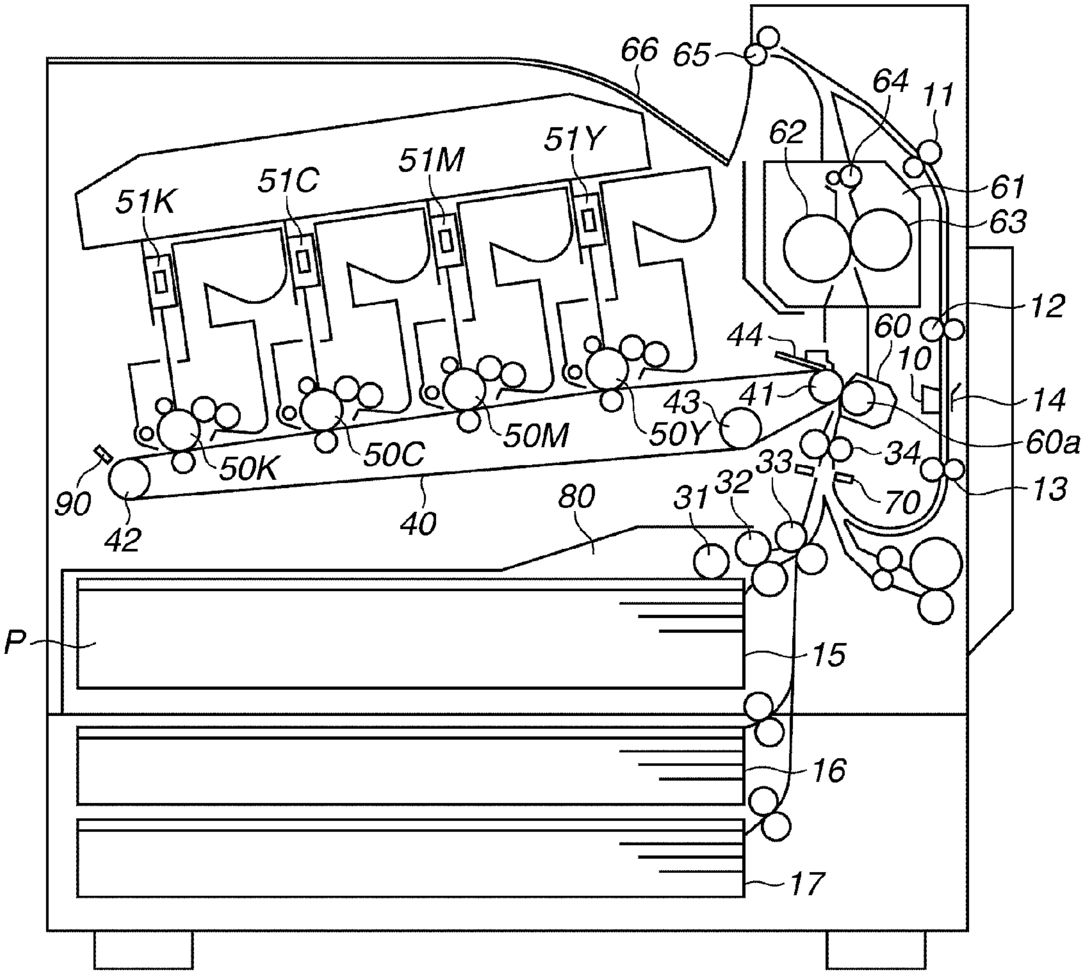
FIG. 1 illustrates a cross-sectional view of a color image forming apparatus.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

The image forming apparatus according to an exemplary embodiment is a color image forming apparatus including a density sensor and a color sensor used for density control of an intermediate member, which can perform gray axis correction control to reproduce images having adequate density-gradation characteristics and chromaticity characteristics on a transfer material, irrespective of image forming conditions.

FIG. 1 illustrates a cross-sectional view of a color image forming apparatus according to a first exemplary embodiment of the present invention. The apparatus illustrated in FIG. 1 is an electrophotographic color image forming apparatus, which is a tandem type color image forming apparatus including an intermediate transfer member.

The color image forming apparatus includes an operation panel that enables a user to operate the apparatus. If the color image forming apparatus is connected to a network, a user of a host personal computer (PC) can also operate the apparatus. The color image forming apparatus includes a printer controller that transmits an image signal to an image data input unit.

The color image forming apparatus includes photosensitive drums 50Y, 50M, 50C, and 50K, which are located in serial image forming stations storing yellow, magenta, cyan, and black toners, respectively. The photosensitive drums 50Y, 50M, 50C, and 50K have photosensitive surfaces exposed to laser beams emitted from laser scanner devices 51Y, 51M, 51C, and 51K corresponding to respective colors based on image data supplied from a color image forming apparatus control unit, to form latent images on the photosensitive drums 50Y, 50M, 50C, and 50K.

When yellow, magenta, cyan, and black toners are supplied onto respective surfaces of the photosensitive drums 50Y, 50M, 50C, and 50K, the latent images formed on the photosensitive drums 50Y, 50M, 50C, and 50K are developed into toner images. An intermediate transfer belt 40 is entrained around a drive roller 41, a tension roller 42, and a driven roller 43 which is rotated according to friction caused by moving of the intermediate transfer belt 40. The color toner images are primarily transferred from respective photosensitive drums 50Y, 50M, 50C, and 50K to the intermediate transfer belt 40.

A paper feeding unit 80 includes a plurality of trays, which store recording materials P (transfer materials) 15, 16, and 17. The color image forming apparatus illustrated in FIG. 1 can perform print processing in a plurality of print modes corresponding to various papers, including plain paper, thin paper, thick paper, and glossy paper, which are different in grammage and surface property. Each paper feeding tray accommodates the same type of recording materials corresponding to each print mode.

"Grammage", expressed using the unit "$g/m^2$", represents the weight of a transfer material per unit area. The color image forming apparatus illustrated in FIG. 1 can perform print processing on recording materials having a grammage in the range from 64 $g/m^2$ to 220 $g/m^2$. In an exemplary embodiment, the surface property indicates a degree of irregularity or roughness of the topmost recording material. In general, glossy papers have smooth surfaces because a resin layer is coated on a base material. Plain papers have various surfaces due to differences in base materials. For example, when base material fibers appear on a paper surface, a degree of irregularity or roughness of the surface is great. However, base material fibers may be arrayed in the similar direction.

A paper feeding roller 31 feeds a recording material P. A feed retard roller pair 32 and a conveyance roller pair 33 convey the recording material P to a registration roller pair 34, which is not rotating. When the recording material P reaches the registration roller pair 34, the recording material P is once stopped by the registration roller pair 34. A media sensor 70 measures optical reflectance at a predetermined position on the recording material P. The image forming apparatus control unit identifies the type of recording material P based on a measurement result obtained by the media sensor 70 and automatically selects an optimum print mode.

Setting of the print mode (corresponding to the type of recording material P) is not limited to automatic selection based on a detection signal of the media sensor 70. A user can manually set a desired print mode via an operation panel of the image forming apparatus or a monitor screen of a personal computer (PC) which displays a printer driver setting screen (not illustrated) operable by the user.

The registration roller pair 34 corrects skew of the recording material P. Then, the recording material P is conveyed to a secondary transfer unit 60 at predetermined timing. The toner image on the intermediate transfer belt 40 is transferred onto the recording material P. A cleaning unit 44 removes toners remaining on the intermediate transfer belt 40.

A secondary transfer roller 60$a$ of the secondary transfer unit 60 and the intermediate transfer belt 40 cooperatively convey the recording material P to a fixing unit 61. The fixing unit 61 includes a fixing roller 62 and a pressing roller 63 between which the recording material P is inserted to fix the toner image. The recording material P, having passed through the fixing unit 61, is conveyed by a fixing discharge roller pair 64 and a discharge roller pair 65, which are sequentially located, and is stacked on a discharge tray 66.

When the printer controller generates a two-sided print command, the discharge roller pair 65 changes the conveyance direction of the recording material P and guides the recording material P toward a two-sided conveyance path along which the conveyance roller pairs 11, 12, and 13 are provided. The recording material P again reaches the registration roller pair 34, which is stopped.

The image forming apparatus illustrated in FIG. 1 includes a density sensor 90, which faces the intermediate transfer belt 40 to measure the density of a toner patch (a test image) formed on the surface of the intermediate transfer belt 40.

Figure 3:
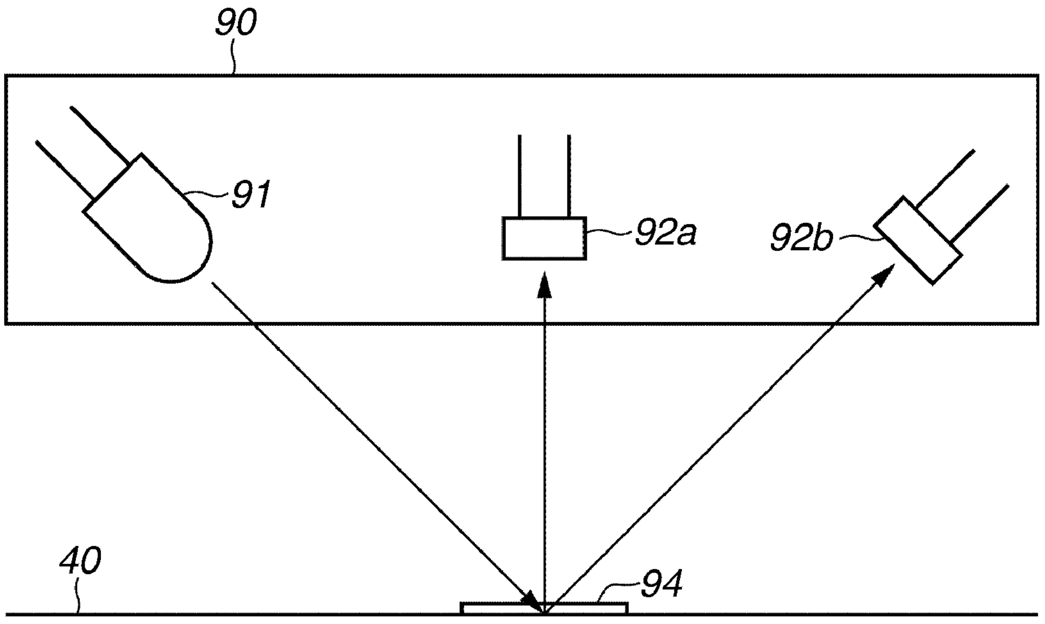
FIG. 3 illustrates an example configuration of a density sensor.

FIG. 3 illustrates an example configuration of the density sensor 90, which includes an infrared light-emitting element 91 (e.g., light-emitting diode (LED)), light-sensitive elements 92$a$ and 92$b$ (e.g., photodiodes or Cds), an integrated circuit (not illustrated) that processes light-sensitive data, and a holder (not illustrated) that houses the sensor components. The light-sensitive element 92$a$ detects the intensity of irregular reflection light from a toner patch 94. The light-sensitive element 92$b$ detects the intensity of regular reflection light from the toner patch 94.

The density sensor 90, capable of detecting both regular reflection light intensity and irregular reflection light intensity, can detect the density of the toner patch 94 in a wide range. However, the density sensor 90 is not configured to identify a color of toner on the intermediate transfer belt 40. Therefore, an exemplary embodiment forms a gradation patch 94 of monochromatic toner on the intermediate transfer belt 40, and reflects density data obtained by the density sensor 90 to a density correction table used for correction of gradation-density characteristics of an image processing unit or process conditions of an image forming unit.

A color sensor 10 is located downstream of the fixing unit 61 on a transfer material conveyance path, and is positioned between conveyance roller pairs 12 and 13 provided along the two-sided conveyance path. The color sensor 10 detects the color of a monochromatic patch or a mixed color patch (a patch formed by mixing a plurality of colors) fixed on the recording material P while the recording material P is conveyed. The color sensor 10 outputs L*a*b* values corresponding to respective patches, using an RGB-to-L*a*b* chromaticity conversion table (not illustrated).

Thus, a color image forming apparatus incorporating a color sensor can automatically detect a fixed image before a recording material is discharged to a discharge unit. More specifically, to cause the color sensor 10 to detect a color of the recording material P, the image forming apparatus control unit generates a color detection command. In response to the command, a driving source (not illustrated) lightly moves an opposing plate 14 toward the color sensor 10 so that a clearance between the color sensor 10 and the recording material P conveyed along the path can be regulated within a predetermined range. In other words, the opposing plate 14 prevents the recording material P from fluctuating and enables the color sensor 10 to accurately perform color detection.

Figure 4:
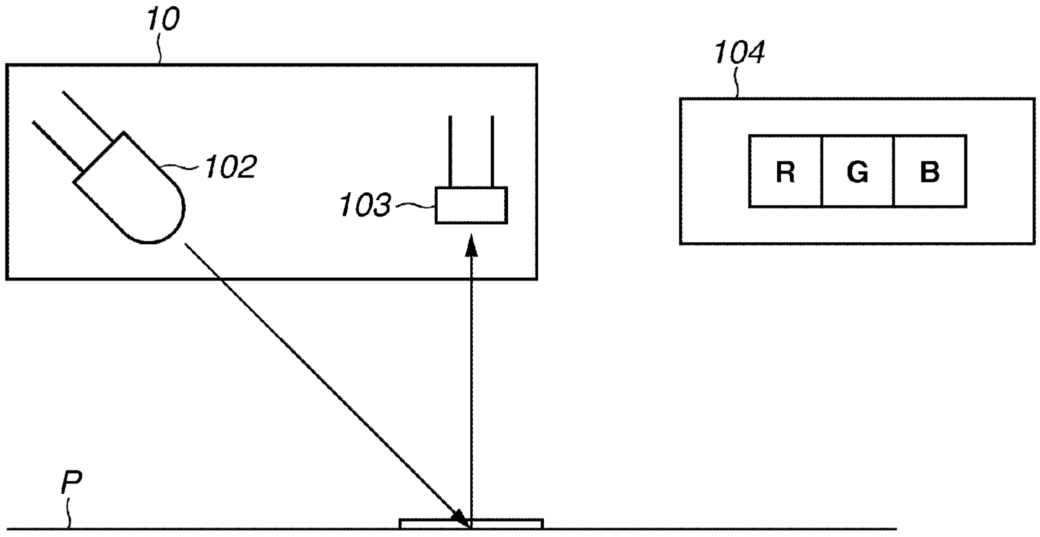
FIG. 4 illustrates an example configuration of a color sensor.

FIG. 4 illustrates a cross-sectional view of the color sensor 10. The color sensor 10 includes a white LED 102 serving as a light-emitting element and a charge-storage sensor 103 equipped with RGB on-chip filters that serves as a light-sensitive element. The white LED 102 emits light obliquely (45 degrees) toward the transfer material P on which a fixed test image is formed. The charge-storage sensor 103, positioned directly above an incident point of the light from the white LED 102, detects the intensity of irregular reflection light from the transfer material P. The charge-storage sensor 103 has a light-receiving portion 104 including RGB pixels that are independently provided.

The light-sensitive element is not limited to the charge-storage sensor 103 equipped with RGB on-chip filters and can be constituted by photodiodes. The light-sensitive element can be arranged to include a plurality of sets of RGB pixels. Setup positions of the light-emitting element 102 and the light-sensitive element 103 can be switched to have an incident angle of zero degrees and a reflection angle of 45 degrees. Furthermore, the color sensor 10 can be configured to include an LED capable of emitting three (e.g., RGB) or more colors and include no filters. Furthermore, a halogen lamp can be used as a white light source and a spectrophotometer equipped with a spectroscope can be used as a light-sensitive element.

Figure 2:
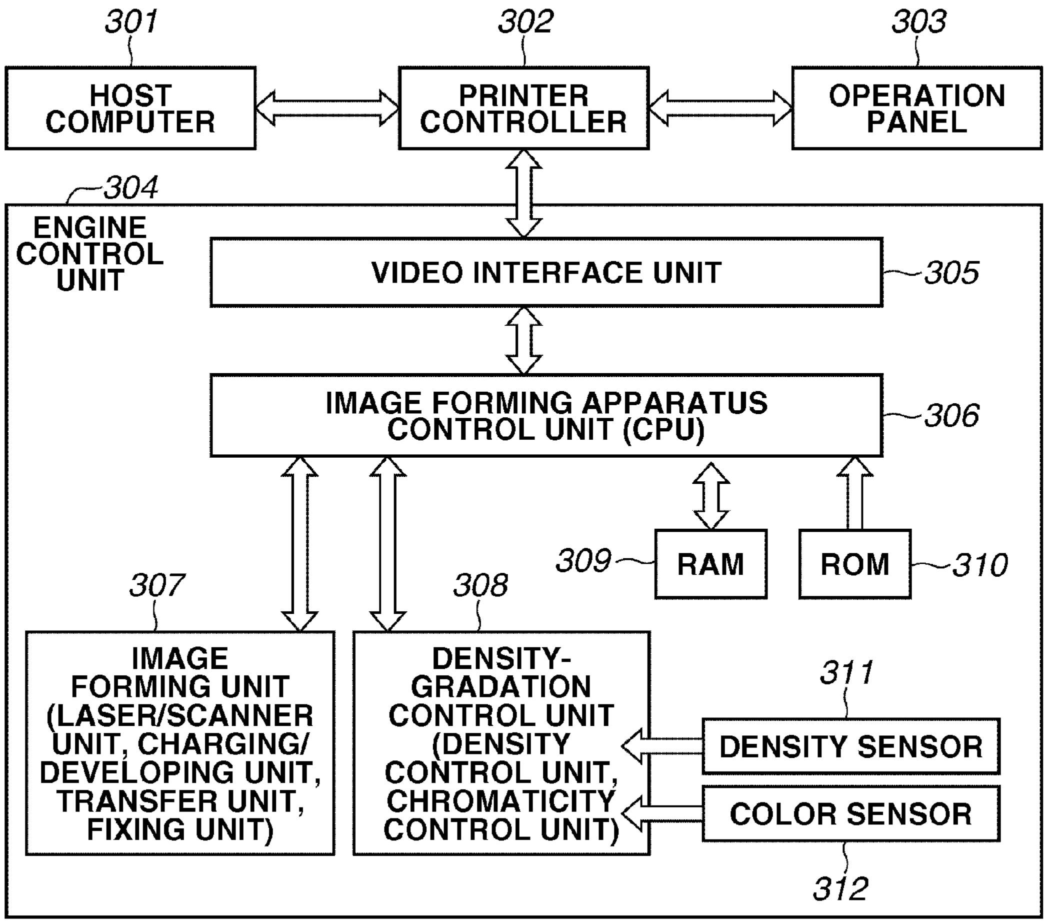
FIG. 2 illustrates functional blocks of the color image forming apparatus.

FIG. 2 illustrates functional blocks of a color image forming apparatus. A printer controller 302 can communicate with a host computer 301, an operation panel 303, and an engine control unit 304.

The printer controller 302 receives an ordinary print command and related image information, or a density-gradation characteristics control command and related image information, from the host computer 301 or the operation panel 303. The printer controller 302 analyzes the image information and converts the image information into bit data. The printer controller 302 transmits a print reservation command, a print start command, and a video signal for each transfer material to the engine control unit 304, via a video interface unit 305.

Furthermore, to start print processing, the printer controller 302 transmits print command information to the engine control unit 304. The printer controller 302 transmits new information to the engine control unit 304 if it is necessary to change the information transmitted. The print command information includes information indicating one-sided print/two-sided print, information indicating full-color mode/mono-color mode, and information indicating the type of transfer material such as plain paper, glossy paper, and thick paper (corresponding to print mode information). Furthermore, the print command information includes feeder cassette port information, transfer material size (e.g., Letter, A3, and A4), and information discriminating an ordinary print execution instruction and a density-gradation characteristics control execution instruction.

Furthermore, the printer controller 302 transmits a print reservation command to the engine control unit 304 according to a print command transmitted from the host computer 301. The printer controller 302 transmits a print start command to the engine control unit 304 when the image forming unit 307 is ready for printing. The engine control unit 304 starts a printing operation when the engine control unit 304 receives a print start command from the printer controller 302.

More specifically, an image forming apparatus control unit (e.g., central processing unit (CPU)) 306 controls an image forming unit 307 based on the information transmitted from the printer controller 302 via the video interface unit 305, and causes the image forming unit 307 to complete a designated print operation. Furthermore, the image forming apparatus control unit (hereinafter, referred to as "CPU") 306 controls a density-gradation control unit 308 that includes a density control unit configured to control a density sensor 311 and a chromaticity control unit configured to control a color sensor 312, when the printer controller 302 designates density-gradation characteristics control.

Moreover, the CPU 306 refers to a random access memory (RAM) 309 or a read-only memory (ROM) 310 and updates the information when the image forming unit 307 performs the above-described printing operation or the density-gradation characteristics control. For example, the RAM 309 stores density-gradation control results. The ROM 310 stores setting values of the image forming unit 307 for each print mode.

Figure 5:
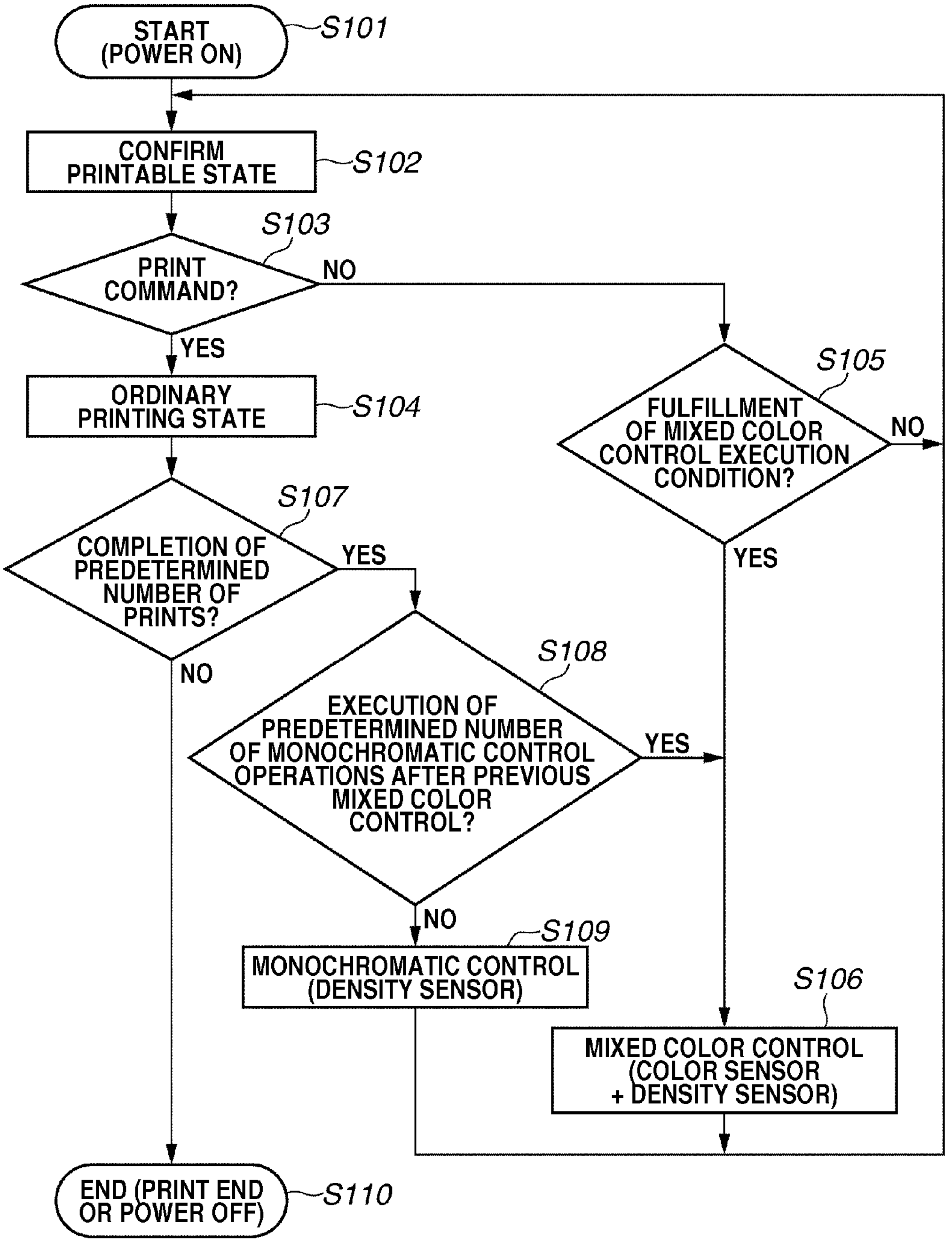
FIG. 5 is a flowchart illustrating example gradation-density characteristics control performed based on a combination of a color sensor output and a density sensor output.

Example gradation-density characteristics control according to an exemplary embodiment is described below. FIG. 5 is a flowchart illustrating example gradation-density characteristics control performed based on a combination of an output of the color sensor 10 and an output of the density sensor 90. To save transfer materials, it is desired to limit the number of controls using the color sensor 10 compared to the number of controls using the density sensor 90.

Hence, to reduce the number of color stabilization controls, an exemplary embodiment combines gradation-density characteristics control using both the color sensor 10 and the density sensor 90 (hereinafter, referred to as "mixed color control") and gradation-density characteristics control using only the density sensor 90 operable for unfixed patch (hereinafter, referred to as "monochromatic control"). The image forming apparatus control unit (CPU) 306 illustrated in FIG. 2 executes processing of each step in the flowchart illustrated in FIG. 5.

In step S101, a user turns on a power source. In step S102, the CPU 306 confirms a printable state of the color image forming apparatus. In step S103, the CPU 306 determines whether a print command is present. If the print command is not present (NO in step S103), the processing proceeds to step S105. In step S105, the CPU 306 determines whether condition for executing the mixed color control is fulfilled.

For example, the mixed color control execution conditions include replacement of cartridge(s), environmental changes occurring after last printing state, and replacement of intermediate transfer member or other parts that have effects on the image quality of print samples. If any one of the above-described conditions is not fulfilled (NO in step S105), the processing returns to step S102. If all of the above-described conditions are fulfilled (YES in step S105), the processing proceeds to step S106. In step S106, the CPU 306 performs mixed color control using both the density sensor 90 and the color sensor 10. Then, the processing returns to step S102.

If in step S103 the CPU 306 determines that a print command is present (YES in step S103), the processing proceeds to step S104. In step S104, the CPU 306 causes the image forming unit 307 to perform an ordinary print operation. In step S107, the CPU 306 determines whether the operation/usage status of the color image forming apparatus indicates completion of a predetermined number of prints. The color image forming apparatus according to an exemplary embodiment can change the predetermined number of prints according to the state of a developing unit or rotation of a photosensitive drum. If the CPU 306 does not confirm completion of the predetermined number of prints in the ordinary print operation (No in step S107), processing ends (step S110). If the CPU 306 confirms completion of the predetermined number of prints in the ordinary print operation (YES in step S107), the processing proceeds to step S108.

In step S108, the CPU 306 determines whether the monochromatic control has been performed a predetermined number of times after execution of the previous mixed color control. If the CPU 306 determines that the monochromatic control has not been performed a predetermined number of times after execution of the last mixed color control (NO in step S108), the processing proceeds to step S109. In step S109, the CPU 306 performs the monochromatic control using only the density sensor 90.

If the CPU 306 determines that the monochromatic control has been performed a predetermined number of times, i.e., when the CPU 306 determines that the previous mixed color control result is not reliable (YES in step S108), the CPU 306 executes the mixed color control in step S106. According to another exemplary embodiment, the CPU 306 can execute the mixed color control and the monochromatic control in response to an instruction manually entered by a user who requests execution of the control.

Figure 6A:
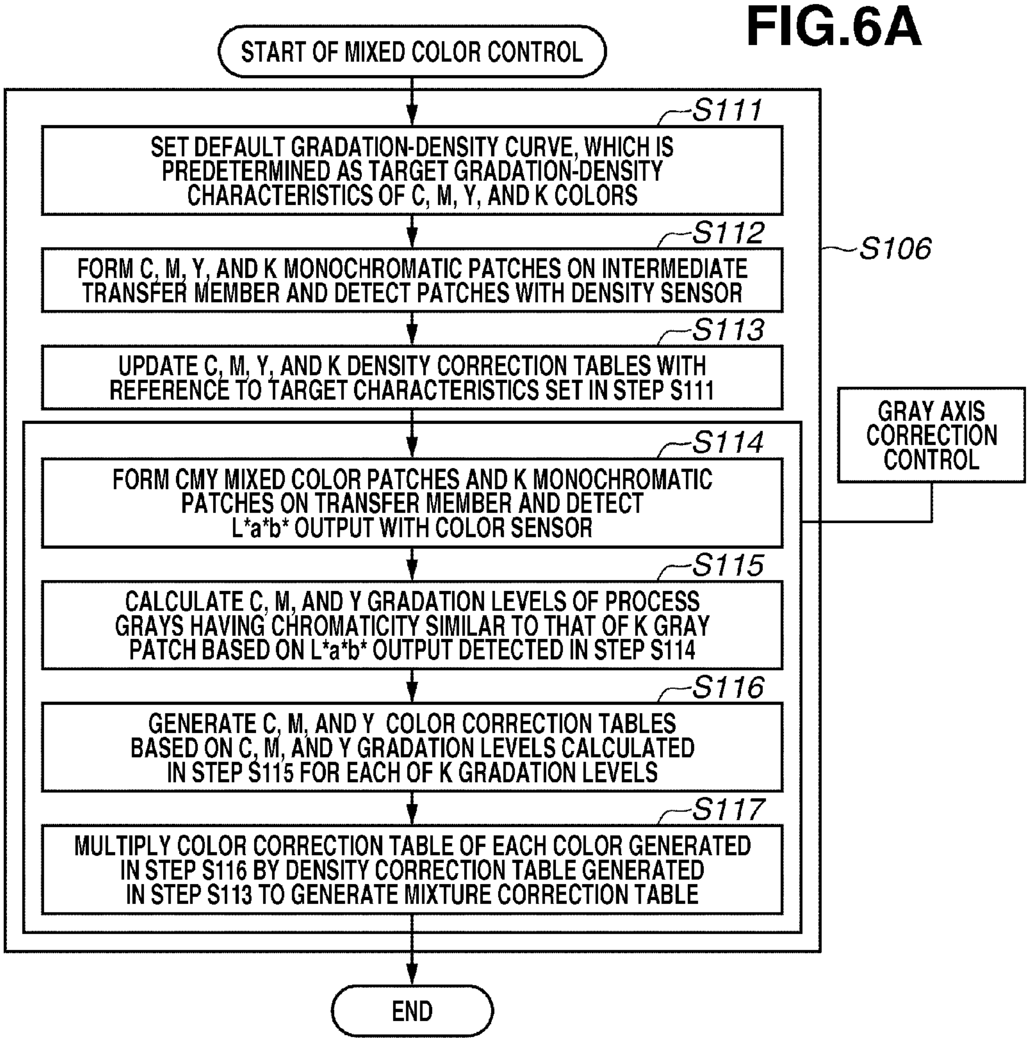
FIG. 6A is a flowchart illustrating details of a mixed color control.
Figure 6B:
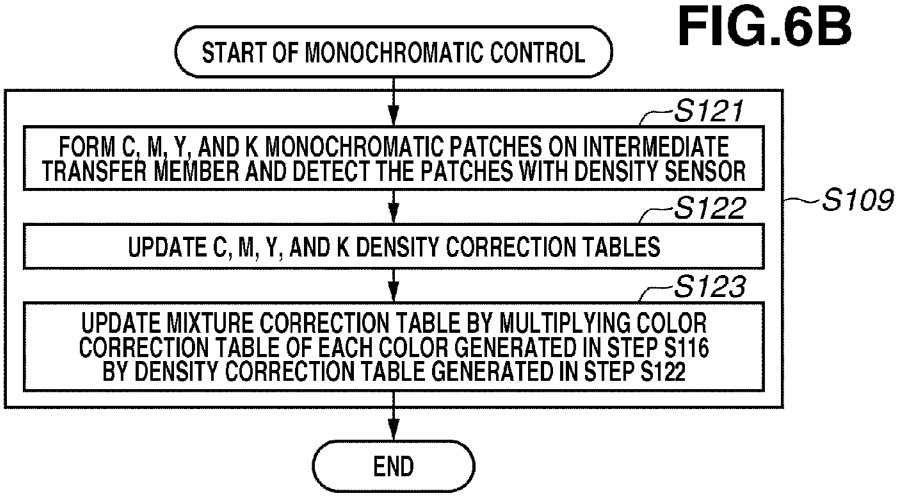
FIG. 6B is a flowchart illustrating details of a monochromatic control.

FIG. 6A is a flowchart illustrating details of the mixed color control (step S106). FIG. 6B is a flowchart illustrating details of the monochromatic control (step S109).

Mixed Color Control

Figure 7:
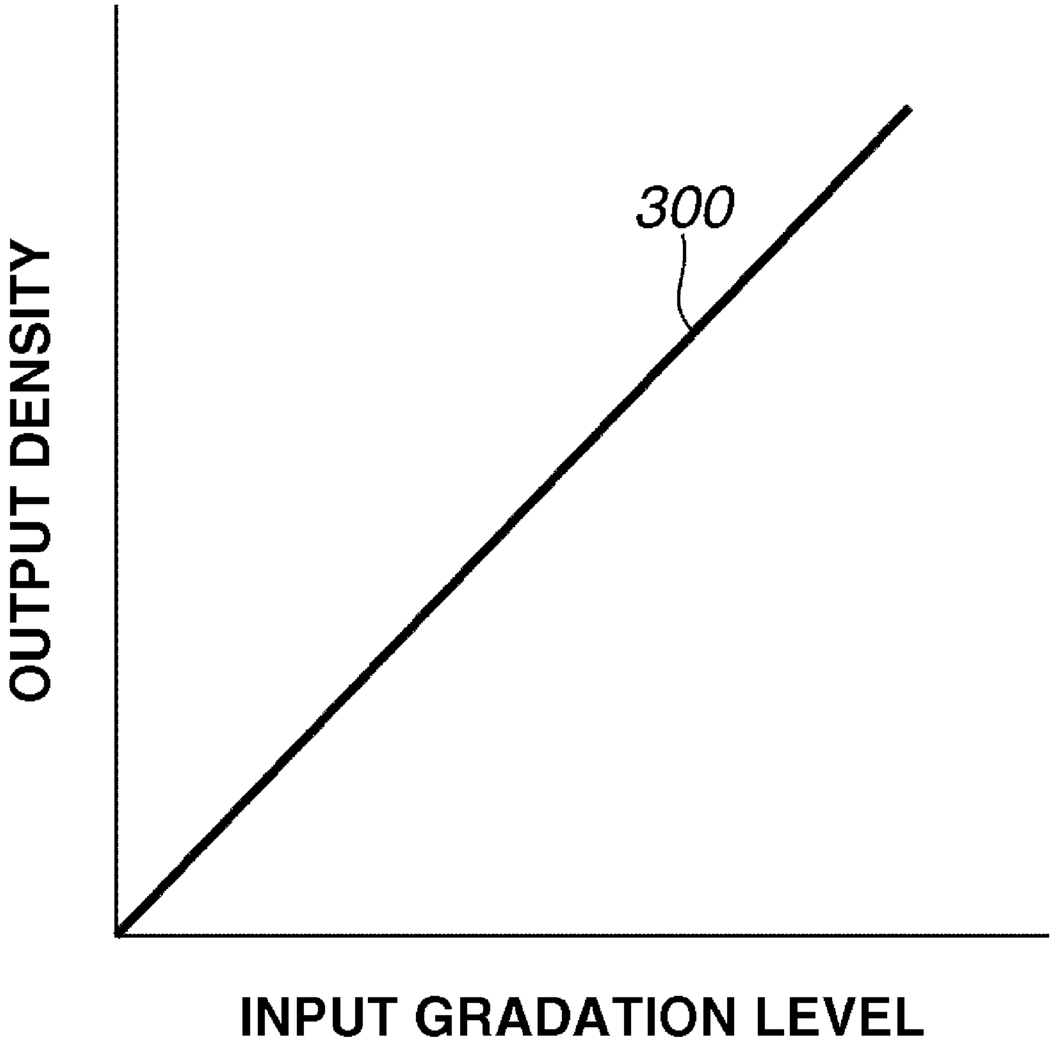
FIG. 7 is a graph illustrating ideal density-gradation characteristics.

In step S111, the CPU 306 uses default gradation-density curves, which are predetermined as target gradation-density characteristics of respective C, M, Y, and K colors. The default gradation-density curves can be set considering characteristics of a color image forming apparatus. FIG. 7 illustrates ideal density-gradation characteristics according to an exemplary embodiment, which defines a linear relationship (target density curve 300) between input gradation level and output density. In step S112, the CPU 306 causes the image forming unit 307 to form a patch pattern on an intermediate transfer member and causes the density sensor 90 to detect the formed pattern.

Figure 8:
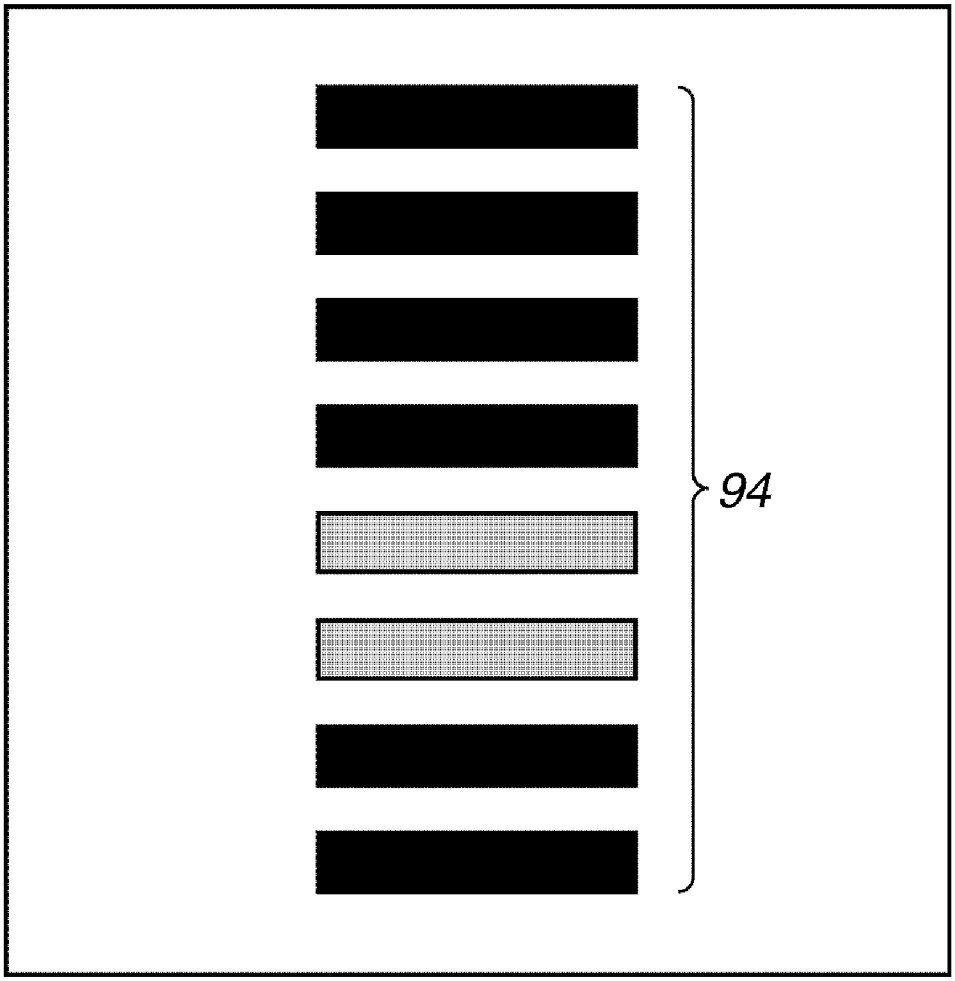
FIG. 8 illustrates an example patch pattern formed on an intermediate transfer member for monochromatic control.

FIG. 8 illustrates an example patch pattern formed on the intermediate transfer member. The patch pattern includes a plurality of monochromatic gradation patches 94 of unfixed K toner. Then, the image forming unit 307 successively forms monochromatic gradation patches of C, M, and Y toners (not illustrated). C, M, Y, and K toners forming the patches have predetermined gradation levels. The density sensor 90 detects the density of patch patterns formed on the intermediate transfer member. The CPU 306 performs interpolation based on detection results shown with black circles in FIG. 9 and generates gradation-density curves.

Figure 9:
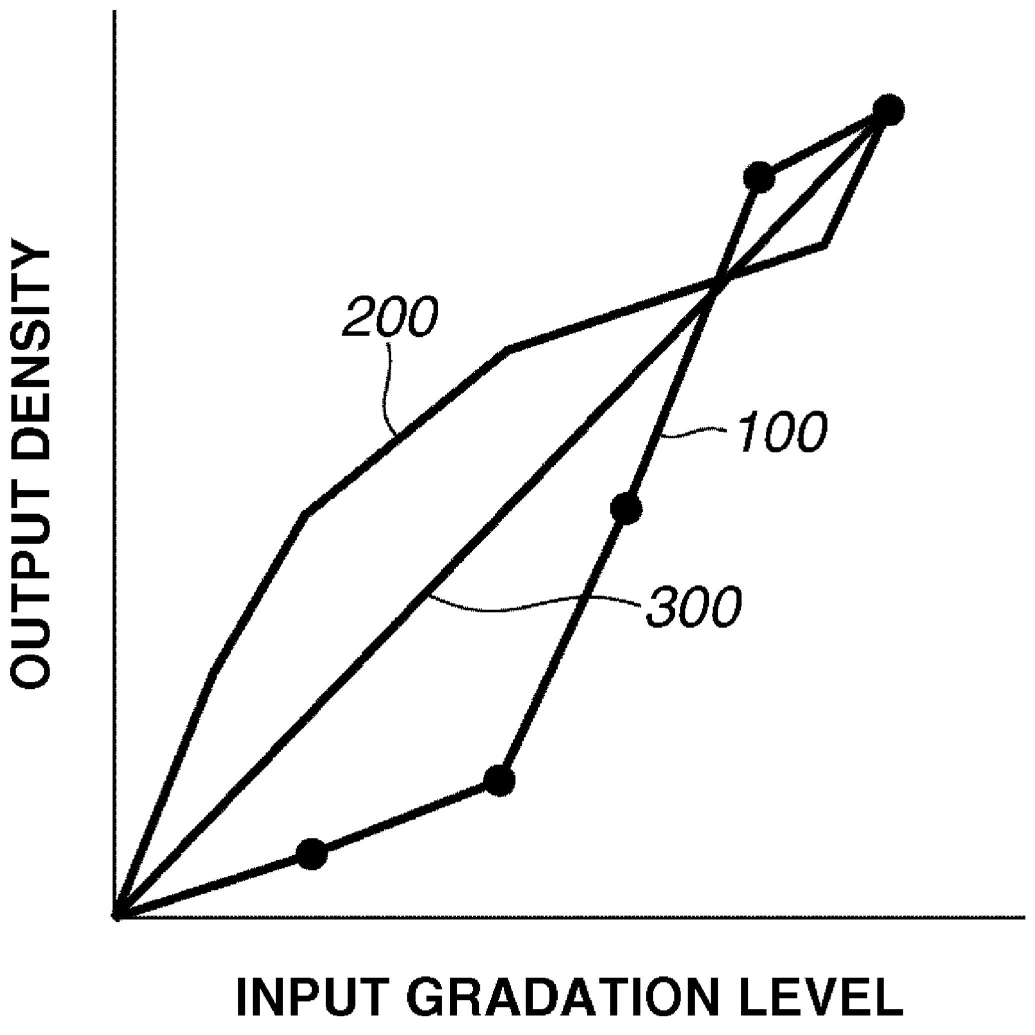
FIG. 9 is a graph illustrating an example processing result of the monochromatic control.

FIG. 9 illustrates an example gradation-density curve 100 obtained by linear interpolation. Furthermore, the CPU 306 calculates inversed characteristics with reference to the target density curve 300 set in step S111. A curve 200 representing the obtained inversed characteristics can be used as a correction table representing a relationship between input image data and density. In step S113, the CPU 306 performs table conversion on input image data referring to the density correction table 200, so that the relationship between input gradation level and output density coincides with the target gradation-density curve 300.

The CPU 306 performs gray axis correction control in steps S114 through S117. In step S114, the CPU 306 forms a plurality of mixed color patches on a transfer material using the density correction table 200 generated in step S113. Furthermore, the CPU 306 forms a plurality of black (monochromatic) patches on the transfer material. More specifically, the CPU 306 forms a plurality of process gray patches (hereinafter, referred to as "CMY mixed color patches") including at least one of cyan, magenta, and yellow colors and K monochromatic patch patterns on the recording material P. The color sensor 10 detects the formed patches. The process gray patches and K monochromatic patch patterns are differentiated according to a designated print mode or the type of transfer material as described later.

FIG. 10 illustrates example patch sets. Each set includes a plurality of mixed color patch data (1) to (6) and K monochromatic data (7). Mixed color patch data, identified by patch No., includes cyan, magenta, and yellow data. Two or more patch sets can be formed by a single gray axis correction control. Gradation levels of mixed color patch data, i.e., C00 to C05, M00 to M05, and Y00 to Y05, can be set by adding or subtracting a predetermined amount (±α) to or from reference values C0, M0, and Y0 (referred to as CMY initial values). The K monochromatic data (7) includes a predetermined value K0.

Figure 11:
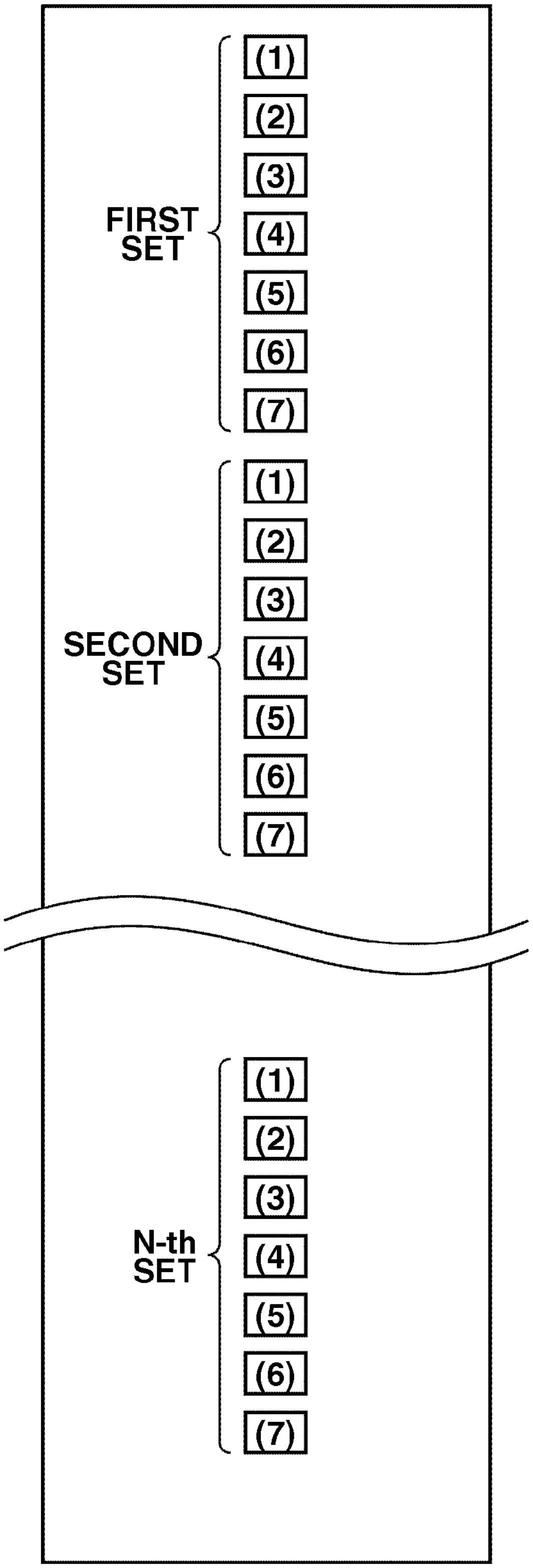
FIG. 11 illustrates an example test image formed on a recording material for the gray axis correction control.

The reference values (C0, M0, Y0) are values that can realize a mixed color similar to K0 when C, M, and Y colors are mixed in a state corresponding to an ideal gradation-density curve after adjusting the K density characteristics to satisfy the relationship defined by the gradation-density curve 300. FIG. 11 illustrates patch patterns (1) to (7) formed on the transfer material. After the recording material P passes through the fixing unit 61, the color sensor 10 detects the patches formed on the recording material P and outputs L*a*b* values.

Next, in step S115, the CPU 306 calculates C, M, and Y values (gradation levels) of process grays having chromaticity equivalent or similar to that of the K patch (7) based on the L*a*b* values output from the color sensor 10. It is now assumed that, according to the patch detection result of the first set, L*a*b* output values of respective mixed color patches are (1)=(L00, a00, b00), (2)=(L01, a01, b01), . . . , and (6)=(L05, a05, b05) and L*a*b* output values of the K monochromatic patch is (7)=(Lk0, ak0, bk0).

The CPU 306 obtains coefficients ac0, ac1, ac2, and ac3 of the following multiple regression formula, by setting explanatory variables (independent variables) for the C, M, and Y gradation levels and criterion variable (dependent variable) for a* as illustrated in FIG. 12.

$$a^* = ac1 \times C + ac2 \times M + ac3 \times Y + ac0 \tag{1}$$

The coefficients ac0, act1, act2, and ac3 can be obtained using the following formula.

$$S = \begin{pmatrix} S_{11} & S_{12} & S_{13} \\ S_{21} & S_{22} & S_{23} \\ S_{31} & S_{32} & S_{33} \end{pmatrix},\ T = \begin{pmatrix} S_{a1} \\ S_{a2} \\ S_{a3} \end{pmatrix},\ B = \begin{pmatrix} ac_1 \\ ac_2 \\ ac_3 \end{pmatrix}$$

If the following relationships are used, $$S_{11}=\sum_{i=0}^{5}(C_{0i}-\overline{C_0})^2,\ \overline{C_0}=\frac{\sum_{i=0}^{5}C_{0i}}{6}$$

$$S_{22}=\sum_{i=0}^{5}(M_{0i}-\overline{M_0})^2,\ \overline{M_0}=\frac{\sum_{i=0}^{5}M_{0i}}{6}$$

$$S_{33}=\sum_{i=0}^{5}(Y_{0i}-\overline{Y_0})^2,\ \overline{Y_0}=\frac{\sum_{i=0}^{5}Y_{0i}}{6}$$

$$S_{12}=\sum_{i=0}^{5}(C_{0i}-\overline{C_0})\times(M_{0i}-\overline{M_0})$$

$$S_{13}=\sum_{i=0}^{5}(C_{0i}-\overline{C_0})\times(Y_{0i}-\overline{Y_0})$$

$$S_{23}=\sum_{i=0}^{5}(M_{0i}-\overline{M_0})\times(Y_{0i}-\overline{Y_0})$$

$$S_{21}=S_{12},\ S_{31}=S_{13},\ S_{32}=S_{23}$$

$$S_{R1}=\sum_{i=0}^{5}(C_{0i}-\overline{C_0})\times(a_{0i}-\overline{a_0}),\ \overline{a_0}=\frac{\sum_{i=0}^{5}a_{0i}}{6}$$

$$S_{R2}=\sum_{i=0}^{5}(M_{0i}-\overline{M_0})\times(a_{0i}-\overline{a_0})$$

$$S_{R3}=\sum_{i=0}^{5}(Y_{0i}-\overline{Y_0})\times(a_{0i}-\overline{r_0})$$

The following simultaneous equations can be derived.

$$S_{a1}=S_{11}ac_1+S_{12}ac_2+S_{13}ac_3$$

$$S_{a2}=S_{21}ac_1+S_{22}ac_2+S_{23}ac_3$$

$$S_{a3}=S_{31}ac_1+S_{32}ac_2+S_{33}ac_3$$

Relationship SB=T is satisfied if the formula (2) is expressed by matrices B, S, and T.

$$B=S^{-1}T$$

Thus, the CPU 306 can obtain ac1, ac2, and ac3. The Gaussian elimination is generally known as a method for obtaining $S^{-1}$. Furthermore, the CPU 306 obtains constant ac0 according to the following formula.

$$ac_0=\overline{a_0}-(ac_1\times\overline{C_0}+ac_2\times\overline{M_0}+ac_3\times\overline{Y_0})$$

Similarly, the CPU 306 obtains coefficients of the following multiple regression formula for L* and b*.

$$L^*=lc1\times C+lc2\times M+lc3\times Y+lc0$$

$$b^*=bc1\times C+bc2\times M+bc3\times Y+bc0$$

If (C0', M0', Y0') represents C, M, and Y values corresponding to the K output value (lk0, ak0, bk0), the following matrix can be derived.

$$\begin{pmatrix} lk_0\\ ak_0\\ bk_0\end{pmatrix}=\begin{pmatrix} lc_1 & lc_2 & lc_3\\ ac_1 & ac_2 & ac_3\\ bc_1 & bc_2 & bc_3\end{pmatrix}\begin{pmatrix} C_0'\\ M_0'\\ Y_0'\end{pmatrix}+\begin{pmatrix} lc_0\\ ac_0\\ bc_0\end{pmatrix}$$

$$\begin{pmatrix} C_0'\\ M_0'\\ Y_0'\end{pmatrix}=\begin{pmatrix} lc_1 & lc_2 & lc_3\\ ac_1 & ac_2 & ac_3\\ bc_1 & bc_2 & bc_3\end{pmatrix}^{-1}\begin{pmatrix} lk_0-lc_0\\ ak_0-ac_0\\ bk_0-bc_0\end{pmatrix}$$

Thus, the CPU 306 can obtain (C0', M0', Y0') values. To obtain (C0', M0', Y0') values in a color image forming apparatus, the CPU 306 rounds off numerical values. In an exemplary embodiment, if a CMY process gray patch has chromaticity similar to that of a K patch, it is regarded that they accord with each other.

Furthermore, by changing the K gradation level, an exemplary embodiment sets a plurality of reference values (CN, MN, YN, KN) (N=0, 1, 2, . . . , n) corresponding to each K. Then, the CPU 306 obtains (CN', MN', YN', KN') corresponding to (CN, MN, YN, KN) based on the above-described patch sets (1) to (7) for each reference value.

Figure 13A:
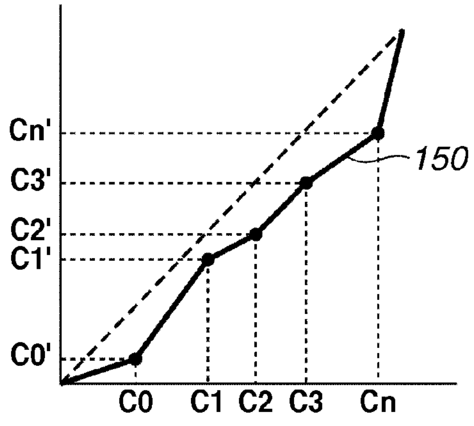
FIGS. 13A and 13B illustrate example gradation input/output characteristics relating to the gray axis correction control.

FIG. 13A illustrates a relationship of cyan between reference values (CN, MN, YN) and (CN', MN', YN') thus obtained. A curve (color correction table) 150 can be obtained by applying linear interpolation to black circles illustrated in FIG. 13A.

Figure 13B:
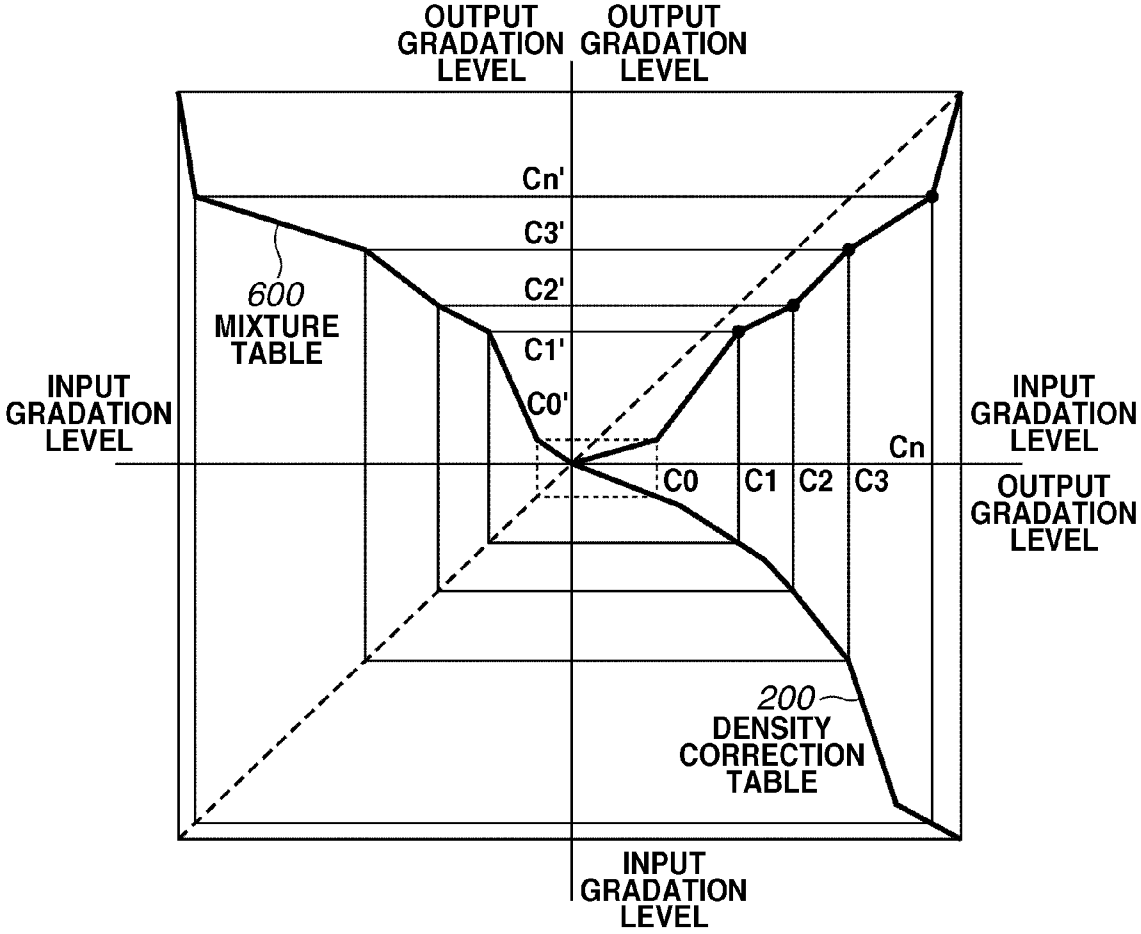

In step S117, the CPU 306 multiplies the color correction table 150 by the density correction table 200 updated/generated in step S113 to obtain a gradation-density curve serving as a gradation level conversion table 600 (mixture correction table) illustrated in the second quadrant of FIG. 13B. When the mixture correction table 600 is used for image formation, the (CN, MN, YN) mixed color can coincide with the KN color.

The phenomenon "human eyes are sensitive to highlight gray and insensitive to shadow" can be taken into consideration to select CN, MN, YN, and KN values. Furthermore, it is possible to select CN, MN, YN, and KN values considering the phenomenon that "UCR processing (processing for replacing part of CMY with K in color separation) is performed in the ordinary color processing and a gray color formed by CMY colors does not appear in a shadow area." The gray axis correction control can be effectively performed by selecting CN, MN, YN, and KN values around the highlight.

Furthermore, it is possible to prepare a color conversion table that is updated based on gray axis correction control results and perform the gray axis correction control in a wide range covering the highlight area and the shadow area, while associating the color conversion table with the color matching table used in the "ordinary color processing."

The mixture correction table 600 thus obtained through the mixed color control can be used in the subsequent print operations to perform density correction on input image data before starting an ordinary print operation. When the CPU 306 confirms completion of the predetermined number of prints in the ordinary print operation (in FIG. 5), the CPU 306 performs the monochromatic density control (step S109).

Monochromatic Control

Next, the monochromatic control (step S109) illustrated in FIG. 6B is described below in more detail. In step S121, the CPU 306 causes the image forming unit 307 to form a patch pattern on the intermediate transfer member and causes the density sensor 90 to detect the formed pattern. The CPU 306 generates a gradation-density curve by performing interpolation on the detected densities. In step S122, the CPU 306 updates the density correction table 200 according to a procedure similar to that in step S113. In step S123, the CPU 306 multiplies the color correction table 150 generated in step S116 by the density correction table 200 generated in step S122 according to a procedure similar to that in step S117 to update the mixture correction table 600.

As described above, an exemplary embodiment combines gray axis correction control results to reproduce desired process gray chromaticity, considering variations appearing in the secondary transfer and later processes. Thus, the monochromatic control according to the exemplary embodiment can realize color reproducibility comparable to that obtained in the mixed color control.

The above-described exemplary embodiment multiplies the density correction table 200 by the correction table 150 to obtain the mixture correction table 600. According to another exemplary embodiment, the mixture correction table 600 can be obtained by correcting the target in the monochromatic control. The above-described exemplary embodiment performs three-dimensional linear interpolation to calculate optimum C, M, and Y values. However, nonlinear interpolation, such as secondary function approximation, third function approximation, or spline interpolation, can be used to calculate optimum C, M, and Y values. According to the above-described exemplary embodiment, "a" is the same value for C, M, and Y. However, "a" can be changed for each color.

Furthermore, the color sensor according to the above-described exemplary embodiment outputs L*a*b* values. However, the color sensor can be configured to output RGB values, L*c*h* values, or XYZ values representing the chromaticity of another color system. Furthermore, the above-described exemplary embodiment matches the color of a CMY mixed color patch with the color of a K patch. However, according to another exemplary embodiment, the color sensor measures L*a*b* values of a CMY mixed color patch and the CPU 306 can calculate appropriate gradation levels to match a CMY mixed color with an achromatic color while setting the achromatic color axis of a=0 and b=0 as a target, for feedback to monochromatic control.

Furthermore, to calculate C, M, and Y gradation levels realizing a color comparable to K, the above-described exemplary embodiment uses a plurality of patch sets including patches (1) to (7) and forms the patch sets on the recording material P. However, setting of gradation levels and arrangement of patches on the recording material P can be modified appropriately. FIG. 18 illustrates another patch pattern including two reference patches (reference 1 and reference 2) for adjusting patch detection timing and a plurality of K monochromatic patches (KN) followed by a plurality of C, M, and Y mixed color patches closer to the reference values (CN, MN, YN).

An exemplary embodiment calculates, based on dE, detection chromaticity of four or more CMY mixed color patches having chromaticity similar to that of a target K monochromatic patch detected by the color sensor, and can perform multiple regression calculation. As described above, the mixed color control can be performed based on a combination of a density sensor and a color sensor.

As described above, electrophotographic image forming apparatuses generally operate in various print modes classified according to the grammage or surface property of transfer material, by changing print speed, or transfer bias. The transfer efficiency and fixed glossy level vary according to surface property, grammage, and thickness of each transfer material. More specifically, gradation-density characteristics vary depending on individual transfer materials (print modes). For example, Canon color laser printer LBP5400 includes cartridges designated by model type: CRG-311CYN, CRG-311MAG, CRG-311YEL, and CRG-311BLK and uses Color Laser Copier Paper (81.4 g/m2) as recording material for the standard print mode and HP Color Laser Glossy Photo Paper (220 g/m2) as recording material for the glossy paper print mode.

Figure 14:
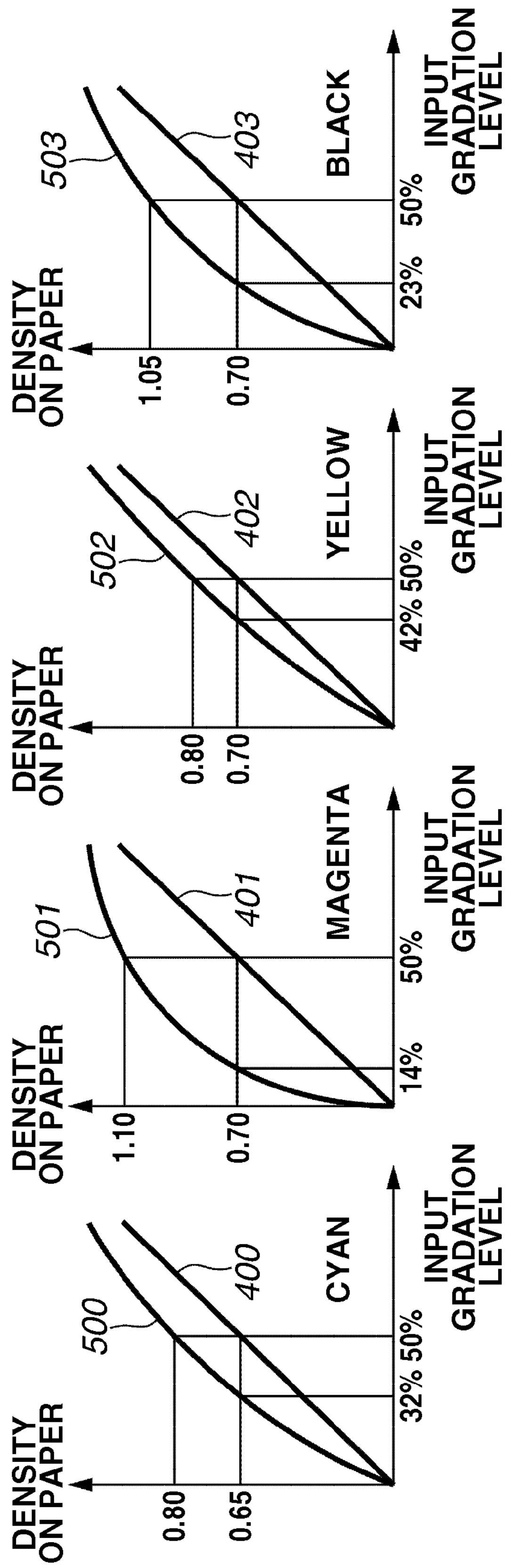
FIG. 14 illustrates example differences in gradation characteristics between a standard print mode and a glossy paper print mode.

FIG. 14 illustrates differences in gradation characteristics between the standard print mode and the glossy paper print mode. The following are process conditions set beforehand to obtain the data illustrated in FIG. 14 in the standard print mode and the glossy paper print mode.

| | Standard Print Mode | Glossy Paper Print Mode |
|---|---|---|
| Process Speed (mm/sec) | 190.0 | 63.3 |
| Fixing Temperature (° C.) | 190 | 180 |
| Charging Potential (Vdark) (V) | 400 | 400 |
| Development Bias (V) | 250 | 250 |
| Exposure Potential (VL) (V) | 75 | 75 |

In FIG. 14, curves 400 to 403 represent C, M, Y, and K gradation-density characteristics for the standard print mode, according to which the chromaticity linearly increases from "paper white" to "solid" when the input gradation level increases. Curves 500 to 503 represent gradation-density characteristics for the glossy paper print mode, which are arc curves shifted upward from the straight lines 400 to 403 of the standard print mode. As is apparent from FIG. 14, it is understood that the density-gradation characteristics of respective print modes vary differently.

Figure 15A:
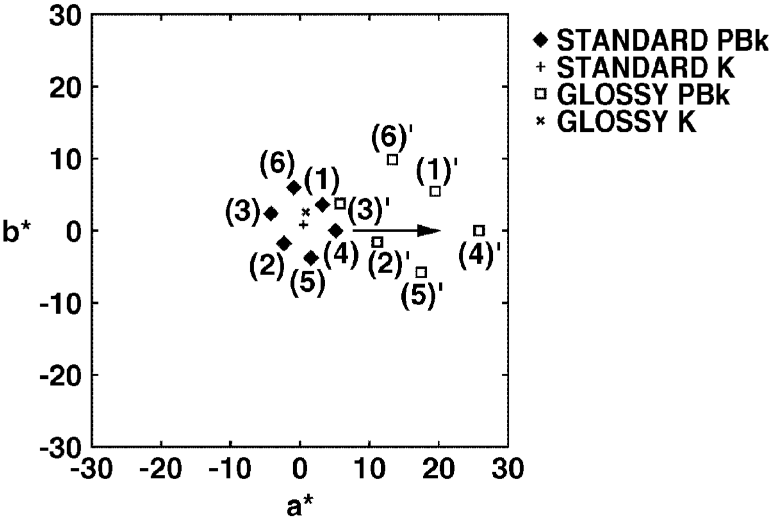
FIGS. 15A through 15C illustrate chromaticity detection results of CMY mixed color patch patterns and K monochromatic patch patterns used for gray axis correction control, detected by a color sensor.
Figure 15B:
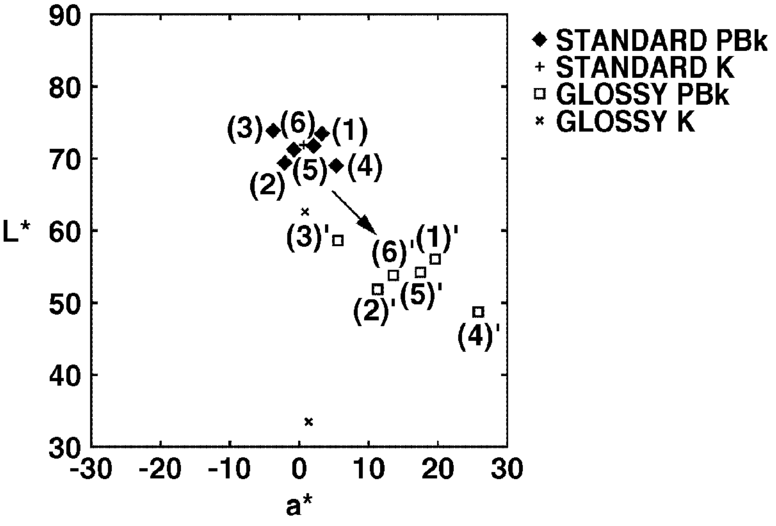
Figure 15C:
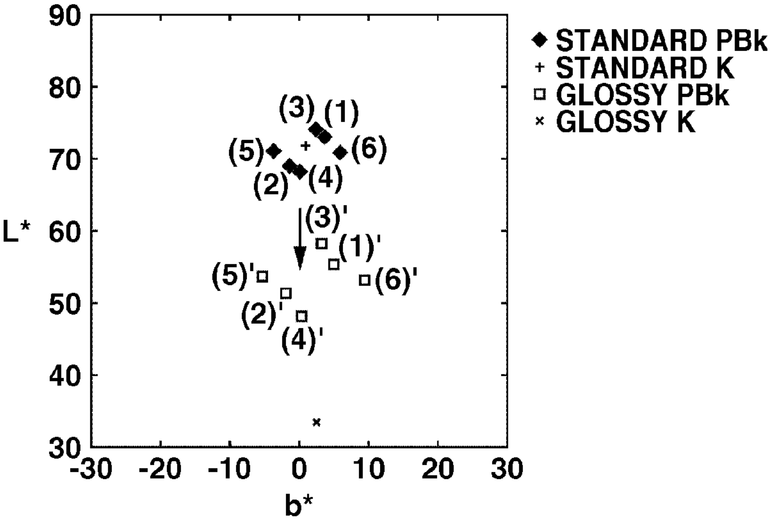

FIGS. 15A through 15C illustrate chromaticity detection results of CMY mixed color patch patterns and K monochromatic patch patterns for the above-described gray axis correction control, which are detected by the color sensor 10 for each of the glossy paper print mode and the standard print mode, using the density correction table updated in step S113, which can realize desired gradation-density characteristics when used for printing in the standard print mode.

FIG. 15A illustrates chromaticity distribution in a cross section of a*-b*. FIG. 15*b* illustrates chromaticity distribution in a cross section of a*-L*. FIG. 15C illustrates chromaticity distribution in a cross section of b*-L*. As illustrated in the drawings, the CMY mixed color patch chromaticity distribution in the glossy paper print mode (glossy PBk in FIGS. 15A through 15C) is offset from the distribution in the standard print mode (standard PBk in FIGS. 15A through 15C) in a direction along which L* value decreases and a* value increases.

In other words, CMY mixed color gray patch chromaticity greatly shifts from the K monochromatic chromaticity (glossy K and standard K in FIGS. 15A through 15C) serving as reference color. The following is the reason why the CMY mixed color patch chromaticity in the glossy print mode shifts in the direction along which L* value decreases and a* value increases.

L* value decreases because, as illustrated in FIG. 14, the gradation-density characteristics 500 through 503 for the glossy paper print mode are arc curves shifting upward, in the entire range of gradation, from the gradation-density characteristics for the standard print mode. Namely, the density increases in the glossy paper print mode. In a printer or an image forming apparatus performing printing based on the principle of additive mixture, brightness (=L*) decreases when the color density increases.

Figure 16:
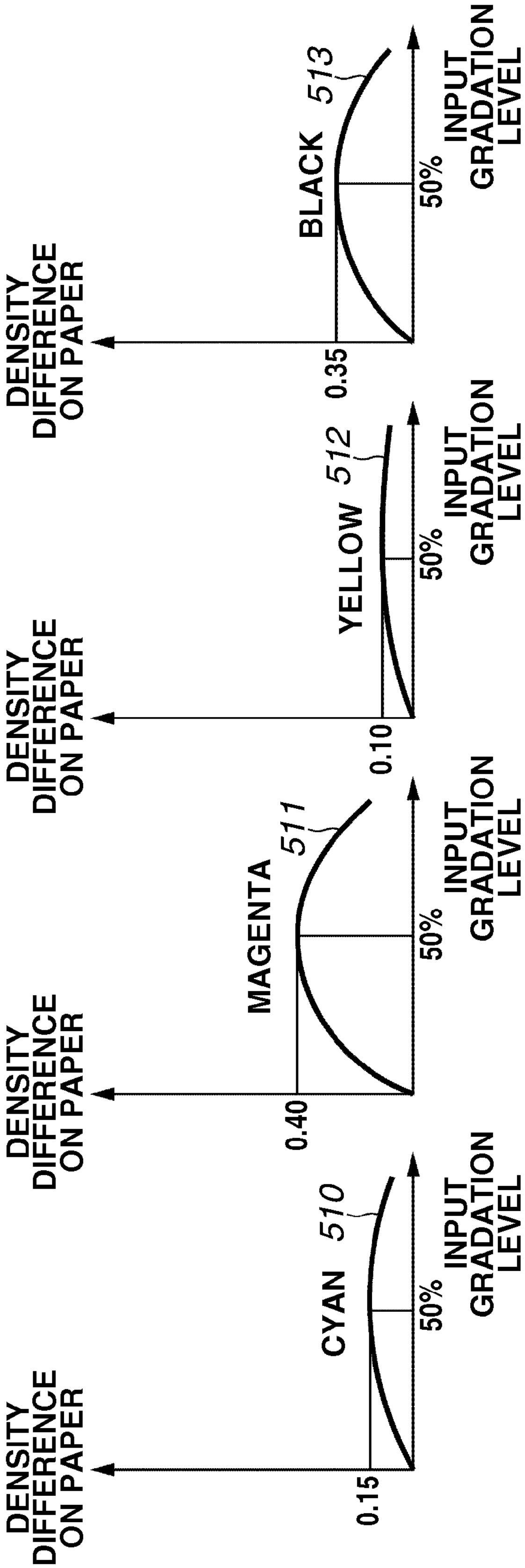
FIG. 16 illustrates example differences in the density on paper relative to input gradation level between the standard print mode and the glossy paper print mode.
Figure 17:
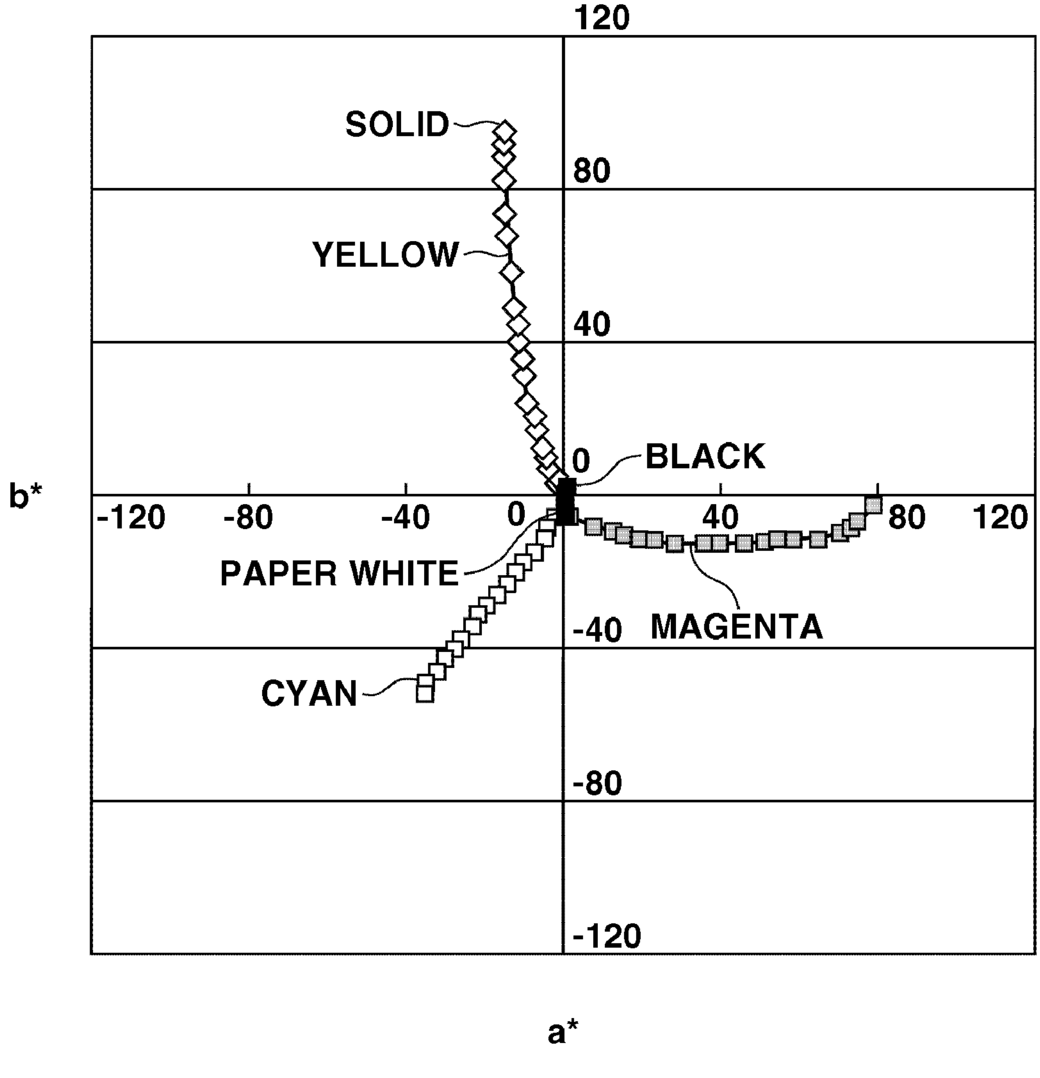
FIG. 17 illustrates hue curves of cyan, magenta, yellow, and black patches formed by a color image forming apparatus.

Following is the reason why the shifting occurs in the +a* direction. FIG. 16 illustrates differences in the density on paper relative to input gradation level between the standard print mode and the glossy paper print mode. FIG. 17 illustrates hue curves of cyan, magenta, yellow, and black monochromatic patches, ranging from "paper white" to "solid" image of Color Laser Copier Paper (81.4 g/m2), according to the above-described standard print mode output conditions.

As understood from FIGS. 16 and 17, the color image forming apparatus according to the above-described exemplary embodiment causes large color differences in magenta compared to the difference in cyan and yellow. In general, if the differences in characteristics between colors are small or negligible, variation in the color mixed process gray patch occurs only in the direction of density (i.e., L*) and not in the direction of hue (i.e., a* and b*), even when the differences in print mode-to-mode density characteristics are recognized.

However, in this case, the color differences in magenta are great compared to those of other colors. As is understood from FIG. 17, the hue of magenta increases from "paper white" in the +a* direction as the gradation increases. In short, the print mode-to-mode differences in gradation characteristics illustrated in FIG. 14 are intrinsic in respective colors. As the hue of magenta increases largely in the +a* direction, test image chromaticity in the glossy paper print mode shifts in the +a* direction.

Next, accuracy in the multiple regression calculation is described referring to a case where the test image chromaticity shifts from the chromaticity of K (reference color in the gray axis correction control). More specifically, how accurately the gradation levels (ratio) of cyan, magenta, and yellow forming optimum process gray having chromaticity similar to that of target black can be calculated, when the chromaticity shift occurs, is described below.

In general, multiple regression analysis assumes that explanatory variable (independent variable) and the criterion variable (dependent variable) have a linear correlation as apparent from the above-described formula (1). However, an electrophotographic image forming apparatus has nonlinearity in the relationship between input gradation level and output sample chromaticity. It is easily understood from the fact that a fine lattice point table of $17^3 \times 8^4$ is used to convert RGB image data for a PC into CMYK image data for a printer and interpolation calculation is used for color conversion.

Therefore, the larger the distance between chromaticity of CMY mixed color patches used for the above-described multiple regression calculation and K monochromatic chromaticity (reference) on a color space, the less linear correlation between chromaticity of CMY mixed color patches and CMY input gradation levels. Thus, estimation accuracy is worsened. More specifically, to accurately calculate C, M, and Y values (gradation levels) that match the color of CMY process gray with the color of K patch of (7) based on the multiple regression calculation, it is required that the color difference between the chromaticity of the target K patch and the chromaticity of CMY mixed color patch is within a predetermined range.

Figure 19:
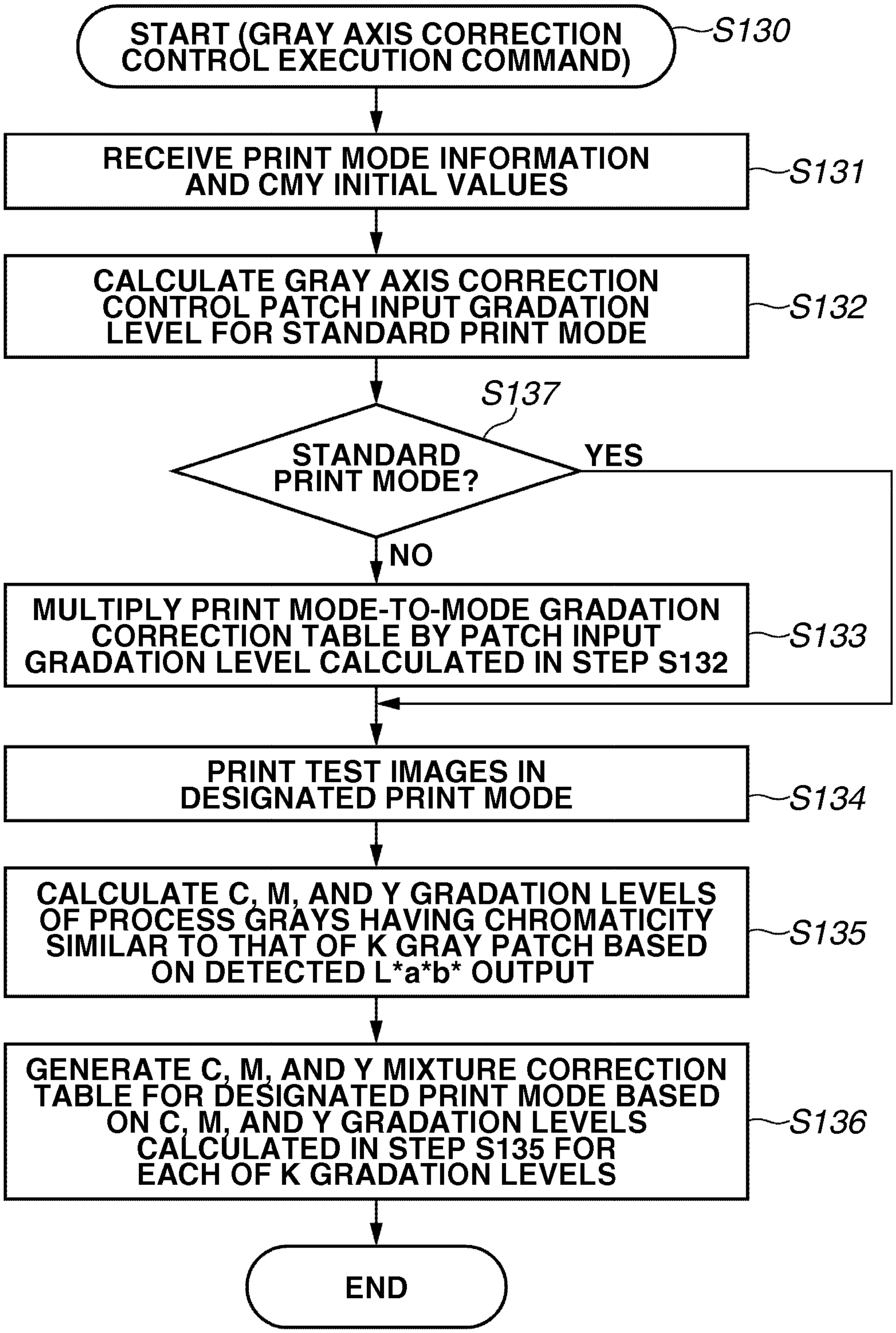
FIG. 19 is a flowchart illustrating example gray axis correction control according to a print mode designated as an image forming condition.

Hence, to reduce chromaticity shift of a test image occurring when print mode-to-mode differences in gradation characteristics are intrinsic in respective colors, an exemplary embodiment sets values capable of realizing density-gradation characteristics comparable to those in the plain paper print mode. More specifically, the exemplary embodiment uses a print mode-to-mode gradation difference correction table to convert input image data of mixed color patches and performs gray axis correction control. FIG. 19 is a flowchart illustrating example gray axis correction control performed in a print mode other than the standard print mode.

In step S130, at predetermined timing (e.g., execution instruction input by a user via the operation panel, or replacement of cartridge (s)), the printer controller 302 transmits a gray axis correction control execution command, via the video interface unit 305, to the CPU 306 of the image forming apparatus.

In step S131, the CPU 306 receives designation of image forming conditions from the printer controller 302 and identifies the designated image forming condition (determines whether the received designation is first image forming condition or second image forming condition). The image forming conditions include print mode (type of media), high-speed print instruction that permits tint variation, ambient temperature, and other various conditions.

In following description, print mode is regarded as a representative image forming condition. More specifically, in step S131, the CPU 306 receives print mode information (type of transfer material), as one of image forming conditions, and CMY initial values included in print command information. The CPU 306 can execute the processing of step S131 and step S130 as processing in the same step.

The CMY initial values are defined as values capable of realizing a mixed color similar to the K monochromatic color having a predetermined gradation in a state where the apparatus is in a shipment and unused conditions and has density characteristics represented by the gradation-density curve 300 (FIG. 9) in a specific print mode.

For example, the CMY initial values correspond to C0, M0, and Y0 described above. The amount of CMY initial values actually prepared corresponds to the example sets (first set, second set, etc.) illustrated in FIG. 10. For example, in step S131, the CPU 306 receives a plurality of CMY initial values from the printer controller 302. The print command information can be replaced by print mode designation included in print data (job data) input into the printer controller 302 via a network from the PC illustrated in FIG. 2.

In step S132, the CPU 306 calculates gray axis correction control patch input gradation levels for the standard print mode, based on the CMY initial values received from the printer controller 302 in step S131, by executing a program (not illustrated) that calculates test image input gradation levels for the gray axis correction control. In this case, as described above, specific colors have values changed by $\pm\alpha$ from reference values (CN, MN, and YN).

If in step S131 the standard print mode (plain paper) is not designated as image forming condition (NO in step S137), in step S133, based on print mode-to-mode gradation correction tables (applicable to correction between the standard print mode and a designated print mode), the CPU 306 converts (calculates) the patch input gradation levels calculated in step S132 into test image input gradation levels suitable for the designated print mode. Processing then proceeds to step S134.

If in step S131 the standard print mode (plain paper) is designated as image forming condition (YES in step S137), the CPU 306 skips step S133 and executes the processing of step S134 based on the patch input gradation levels calculated in step S132.

The CPU 306 selects appropriate print mode-to-mode gradation correction tables according to the image forming condition (print mode) designated by the printer controller 302. Accordingly, if the image forming condition specified in step S132 is a first print mode (first image forming condition), the CPU 306 calculates a combination of first gradation levels suitable for the first print mode and causes the image forming unit 307 to form mixed color patches based on the calculation.

If the image forming condition designated by the printer controller 302 is a second print mode (second image forming condition), the CPU 306 forms mixed color patches based on a combination of second gradation levels. The combination of second gradation levels is different from the combination of first gradation levels.

Figure 20:
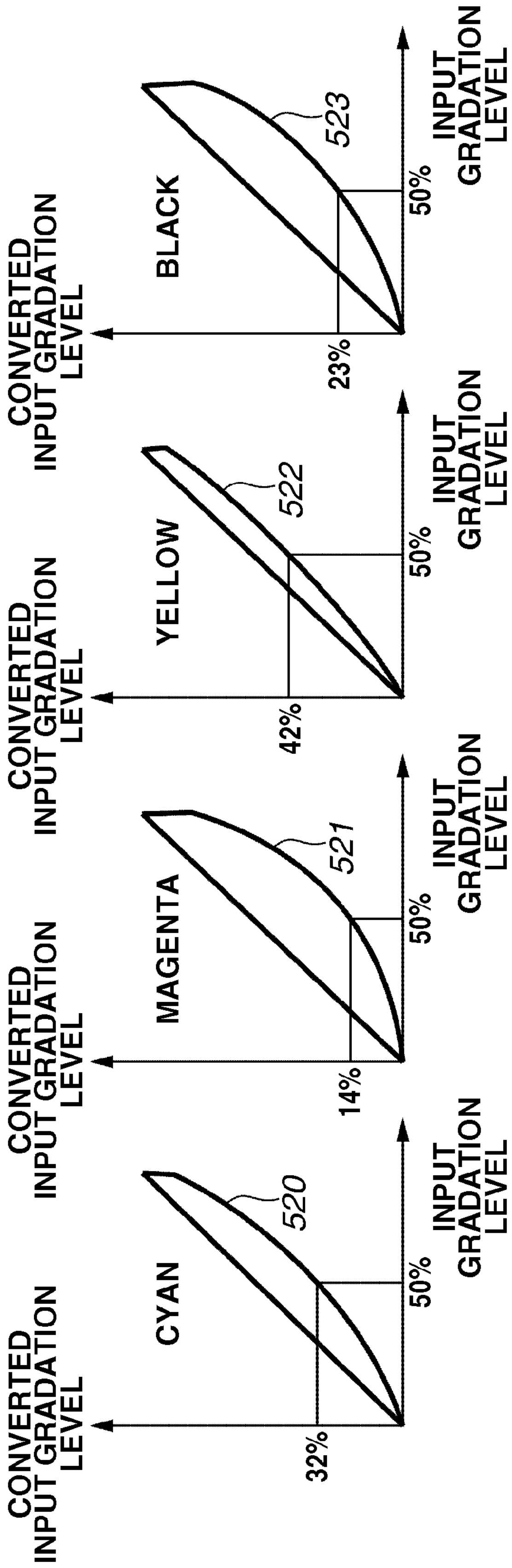
FIG. 20 illustrates print mode-to-mode gradation correction tables (graphs), used for correction between the standard print mode and other print mode of a color image forming apparatus.

FIG. 20 illustrates example print mode-to-mode gradation correction tables applicable to correction between the standard print mode and a specific print mode. In FIG. 20, curves (tables) 520 to 523 are inverse characteristics of the glossy paper print mode density-gradation characteristics 500 to 503, inversed with reference to the standard print mode gradation-density characteristics 400 to 403 illustrated in FIG. 14 having been subjected to the monochromatic control.

An example method for obtaining an inverse characteristics curve is described below with reference to the example curves of cyan illustrated in FIG. 14. The method includes comparing the gradation-density characteristics 400 usable for the standard print mode with the density-gradation characteristics 500 usable for the glossy paper print mode, which are subjected to the monochromatic control.

Furthermore, the method includes obtaining an input gradation level (e.g., 32%) as converted input gradation level in the glossy paper print mode capable of attaining a same density as that on paper (e.g., 0.65) corresponding to a specific input gradation level (e.g. 50%) in the plain paper print mode, based on the comparison result. The method repetitively performs the same processing for each density on paper. The method further including correlating the input gradation levels with the converted input gradation levels to obtain the tables 520 to 523 illustrated in FIG. 20.

In step S134, the CPU 306 multiplies the tables 520 to 523 by the patch input gradation levels calculated in step S132 and causes the image forming unit 307 to form a test image of patches on a transfer material, via primary transfer, secondary transfer, and fixing processes, according to a designated print mode. More specifically, the CPU 306 causes the image forming unit 307 to form a required number of mixed color patches and black monochromatic patches based on CMY initial values calculated in step S133, with reference to the table illustrated in FIG. 10.

Process gray and black plots in the L*a*b color space of the test image obtained by the gradation correction tables illustrated in FIG. 20 are similar in both hue and luminosity in the standard print mode illustrated in FIGS. 15A through 15C. In other words, when patch input gradation levels of a test image can absorb differences in print mode-to-mode gradation characteristics beforehand, differences in gradation characteristics between the designated print mode and the standard print mode can be neglected.

Thus, even in a print mode other than the standard print mode, color differences between the chromaticity of a target K patch and the chromaticity of a CMY mixed color patch used for the multiple regression calculation can be reduced appropriately. As a result, an exemplary embodiment can form a mixed color patch based on a combination of gradations of respective colors suitable for the designated print mode and can detect the formed color patch.

Therefore, when a color sensor detection result is plotted in the L*a*b color space, the black detection result can be enclosed by the mixed color patch detection result. Thus, an exemplary embodiment can improve estimation accuracy in the multiple regression calculation. For example, accuracy in the multiple regression calculation can be improved when plots (1) to (6) surround standard K(+) or glossy K(+) on the L*a*b color space of standard Bk illustrated in FIGS. 15A through 15C.

In step S135, the CPU 306 performs multiple regression calculation to obtain C, M, and Y gradation levels of process gray having the chromaticity similar to that of the K gray patch based on the detected L*a*b* output (similar to step S115 in FIG. 6). The chromaticity detection result of the test image printed in step S134 has a value similar to that in the ordinary print mode. On the other hand, gradation levels are different from those in the ordinary print mode, if they are converted from the patch input gradation levels using the print mode-to-mode gradation correction table in step S133. Therefore, the C, M, and Y gradation levels calculated in step S135 are different from the result in the ordinary print mode.

According to the above-described exemplary embodiment, the CPU 306 calculates C, M, and Y gradation levels of process gray having chromaticity equivalent or similar to that of K (black) gray patch. However, if the updated K density-gradation characteristics are inappropriate and variation in the luminosity of the reference K is not negligible ($\Delta E>3$, when $\Delta E$ represents the color difference perceived by human eyes when only the luminosity changes), luminosity of the CMY mixed color gray may change according to the variation of K.

As a result, color processing and halftone characteristics may deviate from gradation-density characteristics of respective colors having been designated beforehand. To avoid such drawbacks, the CPU 306 can calculate K gradation level to attain target luminosity based on the chromaticity of K gray patch detected in step S135. Then, the CPU 306 can calculate C, M, and Y gradation levels of process gray having chromaticity similar to that of predicted chromaticity corresponding to the predicted K gradation level.

In step S136, the CPU 306 obtains C, M, and Y mixture correction tables for the designated print mode based on the C, M, and Y gradation levels calculated in step S135 at a plurality of K gradation levels, according to a procedure similar to that in step S117 of FIG. 6. The following image forming processing is similar to the gray axis control processing described with reference to FIG. 6.

As described above, according to the first exemplary embodiment, the type of transfer material (plain paper, glossy paper, etc.) or the type of print mode is taken into consideration to form patches. Therefore, the gray balance adjustment can obtain appropriate results. Furthermore, the first exemplary embodiment can complete gray axis correction control within a short time for a print mode other than the standard print mode, without adjusting gradation characteristics beforehand by performing monochromatic control in each print mode. Therefore, in an image forming condition other than the standard print mode, the first exemplary embodiment can reproduce, on a paper, appropriate density-gradation characteristics and chromaticity characteristics comparable to those in the standard print mode.

According to the above-described exemplary embodiment, the chromaticity of a test image shifts in the +a* direction because magenta has large mode-to-mode differences in gradation characteristics compared to those of other colors. However, the mode-to-mode differences in gradation characteristics tend to become larger in every color due to differences in transfer property that is variable depending on the charge amount of toner, or differences in color developing property in a fixing process, in color materials used for an image forming apparatus. Therefore, shifting of the chromaticity is not limited to the +a* direction.

Moreover, according to another exemplary embodiment, the print mode-to-mode gradation correction tables can be prepared and stored beforehand for a plurality of print modes including the glossy paper print mode. The print mode-to-mode gradation correction tables can be modified considering the usage environment and/or usage range of cartridge (s) of an image forming apparatus.

The first exemplary embodiment uses print mode-to-mode gradation correction tables. A second exemplary embodiment of the present invention differs from the first exemplary embodiment of the present invention in that gray axis correction control is performed in each print mode without using the print mode-to-mode gradation correction tables described in the first exemplary embodiment. The second exemplary embodiment has the following features, which are not described in the first exemplary embodiment.

The second exemplary embodiment sets target gradation characteristics for the gray axis correction control considering differences in density-gradation characteristics depending on the type of print mode or the type of media. For example, gradation levels of each process gray patch calculated in step S135 of FIG. 19 are stored beforehand in a memory (e.g., the ROM 310 serving as a storage unit). The CPU 306 performs the gray axis correction control by executing the processing of step S136 in FIG. 19 based on readout gradation level information.

In an exemplary embodiment, the CPU 306 sets target gradation characteristics for the gray axis correction control considering differences in gradation characteristics between the standard print mode and the glossy paper print mode illustrated in FIG. 14 described in the first exemplary embodiment.

An exemplary embodiment is described with reference to a flowchart illustrated in FIG. 21. Similar to the first exemplary embodiment, in step S230, the printer controller 302 transmits a gray axis correction control execution command to an image forming processing unit of the color image forming apparatus at predetermined timing (e.g., user's execution instruction via the operation panel, or replacement of cartridge).

In step S231, the CPU 306 receives print mode information (type of transfer material) and CMY initial values according to the print mode transmitted from the printer controller 302. The CMY initial values at this moment are similar to the values calculated in step S135 of FIG. 19.

FIGS. 22A to 22C illustrate example CMY initial values for respective print modes, which are stored in the ROM 310. The CPU 306 can refer to the CMY initial values stored in the ROM 310 when the CPU 306 executes processing according to the flowchart illustrated in FIG. 21.

In FIG. 22A, type A includes a plain paper print mode and a thin paper print mode, which are similar in gradation characteristics. Type B includes a glossy paper print mode and a thick paper print mode, which are similar in gradation characteristics. FIG. 22B illustrates CMY initial values for the type A. FIG. 22C illustrates CMY initial values for the type B.

Two types of CMY initial values can be determined based on the target gradation characteristics of the plain paper print mode and the glossy paper print mode illustrated in FIGS. 14 and 20. First through eighth gradations illustrated in FIGS. 22B and 22C correspond to the first set, second set, third set, . . . , and eighth set illustrated in FIG. 10. Although FIGS. 22B and 22C do not illustrate K gradation levels, the ROM 310 stores K initial values corresponding to first through eighth corrected gradations for each print mode.

According to the examples illustrated in FIG. 14, if the gradation levels of C, M, Y, and K are set to 50% in the standard print mode, the gradation levels of C, M, and Y in the glossy paper print mode are 32%, 14%, and 42%. CMY initial values corresponding to these values are stored beforehand in a memory. Similarly, K value corresponding to the gradation level of 23% is stored in the memory. Numerical values, such as 32%, 14%, 42%, and 23%, are mere examples. Other appropriate values can be used. The above-described setting level of 50% corresponds to any correction gradation in FIGS. 22B and 22C. Initial values for two or more types of gradation levels can be prepared beforehand as illustrated in FIGS. 22B and 22C, which include first corrected gradation, second corrected gradation, . . . , and eighth corrected gradation.

Next, in step S232, the CPU 306 calculates patch gradation levels for the gray axis correction control based on the information (CMY initial values) received from the printer controller 302 for a designated print mode, by executing a program (not illustrated) for calculating input gradation levels of a test image for the gray axis correction control. The CPU 306 performs the calculation for each of the prepared first through eighth gradations.

The exemplary embodiment is different from the first exemplary embodiment in that CMY initial values are set for each print mode considering differences in density-gradation characteristics between print modes. Therefore, the exemplary embodiment can reduce color differences between target K patch chromaticity and CMY mixed color patch chromaticity appropriately without using print mode-to-mode gradation correction tables. The exemplary embodiment can improve estimation accuracy in multiple regression calculation. The exemplary embodiment can reduce processing load required for multiple regression calculation.

Then, in steps S234 through S236, the CPU 306 performs processing similar to the above-described processing in steps S134 through S136 according to the first exemplary embodiment.

The above-described second exemplary embodiment can be modified in the following manner. The second exemplary embodiment uses input gradation levels for gray axis correction control patches stored beforehand, instead of performing calculation in step S132 or step S133 described in the first exemplary embodiment. However, in this case, a gradation correctable range by the gray axis correction control may shift more toward the highlight area than that in the plain paper print mode. As a result, a correctable gradation range is reduced.

A third exemplary embodiment according to the present invention sets CMYK initial values considering mode-to-mode differences in gradation characteristics (e.g., FIG. 14). More specifically, the third exemplary embodiment sets initial values optimum for a unique reproducible range of a printer, beforehand for each print mode, from low density gradation to high density gradation, so as to reduce color differences between test image K patch chromaticity and CMY mixed color patch chromaticity.

Thus, the third exemplary embodiment can set appropriate CMYK initial values for each print mode, although the reproducible range of each printer is intrinsic. The third exemplary embodiment can correct gray balance in a wide gradation range, compared to the first and second exemplary embodiments. The third exemplary embodiment can perform accurate color adjustment.

The above-described embodiment can be further modified in the following manner. The first exemplary embodiment uses the gradation correction table 523 illustrated in FIG. 20, which is applicable to black monochromatic patches to realize hue and luminosity comparable to those in the standard print mode. The second exemplary embodiment uses the gradation level of black corrected in the first exemplary embodiment.

However, the present invention is not limited to the above-described exemplary embodiments. An exemplary embodiment forms black monochromatic patches having input gradation level determined beforehand for the standard print mode, irrespective of print mode, and uses predicted result obtained by interpolating the detection result.

More specifically, regarding the black monochromatic color, expansion or compression change in the luminosity direction is dominant irrespective of print mode-to-mode differences in gradation characteristics. Even when a change occurs in the hue direction, the chromaticity does not change so much. Accordingly, the exemplary embodiment can easily predict a black reproducible range (graph) on the L*a*b* space based on the chromaticity of black monochromatic patch formed without using the correction table 523.

Figure 21:
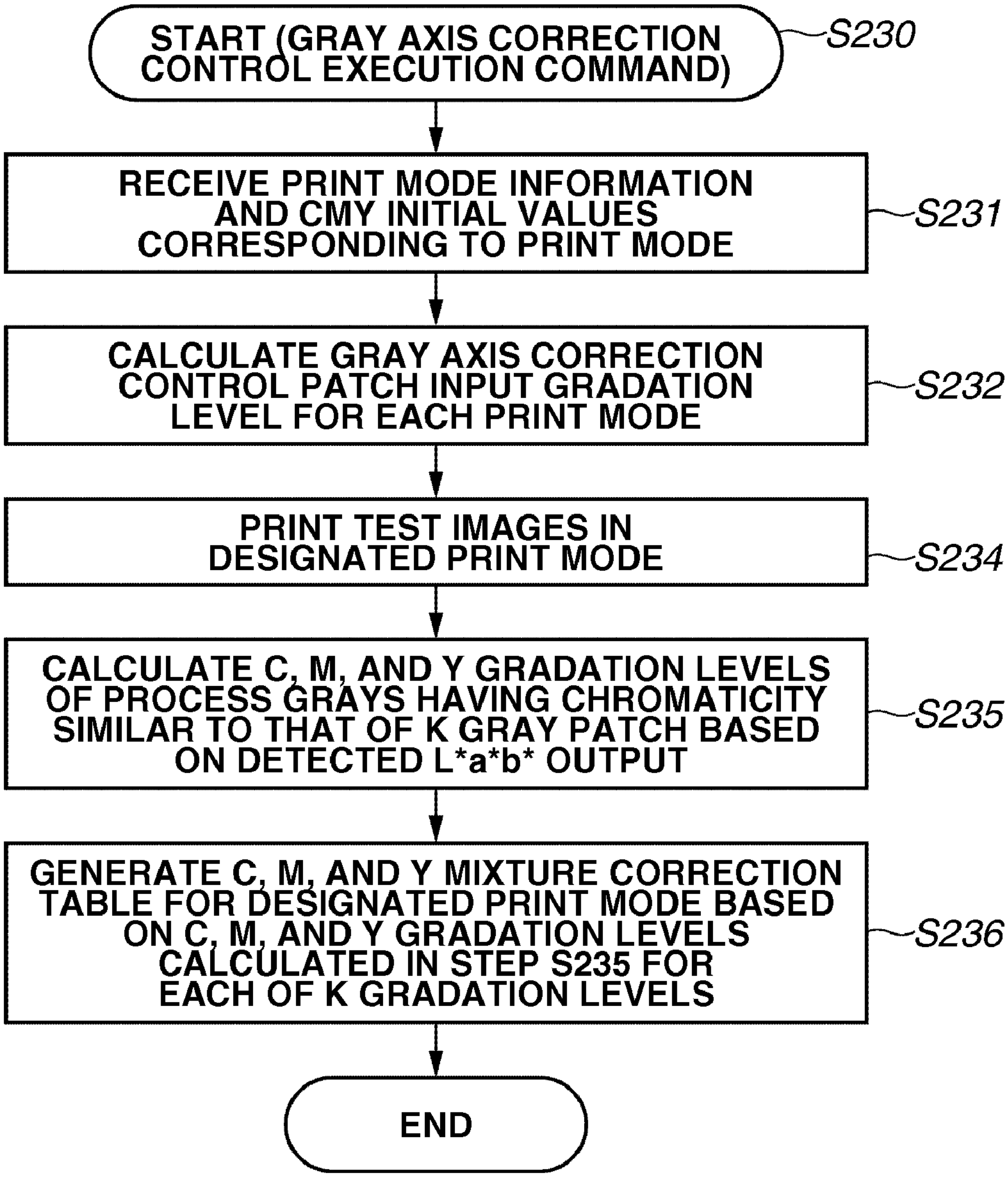
FIG. 21 is a flowchart illustrating example gray axis correction control according to a print mode designated as an image forming condition.

Then, the exemplary embodiment obtains an appropriate calculation result by executing processing in step S115 of FIG. 6, step S135 of FIG. 19, and step S235 of FIG. 21 based on desired predicted chromaticity corresponding to a black monochromatic color and chromaticity detection result of mixed color patch according to the above-described CMY initial values.

As described above, the third exemplary embodiment can obtain a calculation result of each gradation level of mixed color patch comparable to that described in the first exemplary embodiment, without using the gradation correction table 523 illustrated in FIG. 20. Furthermore, the third exemplary embodiment does not require storing, for each print mode, black gradation levels corresponding to the first through eighth corrected gradations illustrated in FIGS. 22B and 22C. Thus, the third exemplary embodiment can reduce a required memory capacity.

A fourth exemplary embodiment of the present invention predicts gray axis correction control result (each gradation level of each color of mixed color patch) corresponding to other image forming condition (print mode), using gray axis correction control result (calculation result) according to an image forming condition described in the first to third exemplary embodiments. The image forming condition is, for example, print mode (media type) designated by a user.

Figure 23:
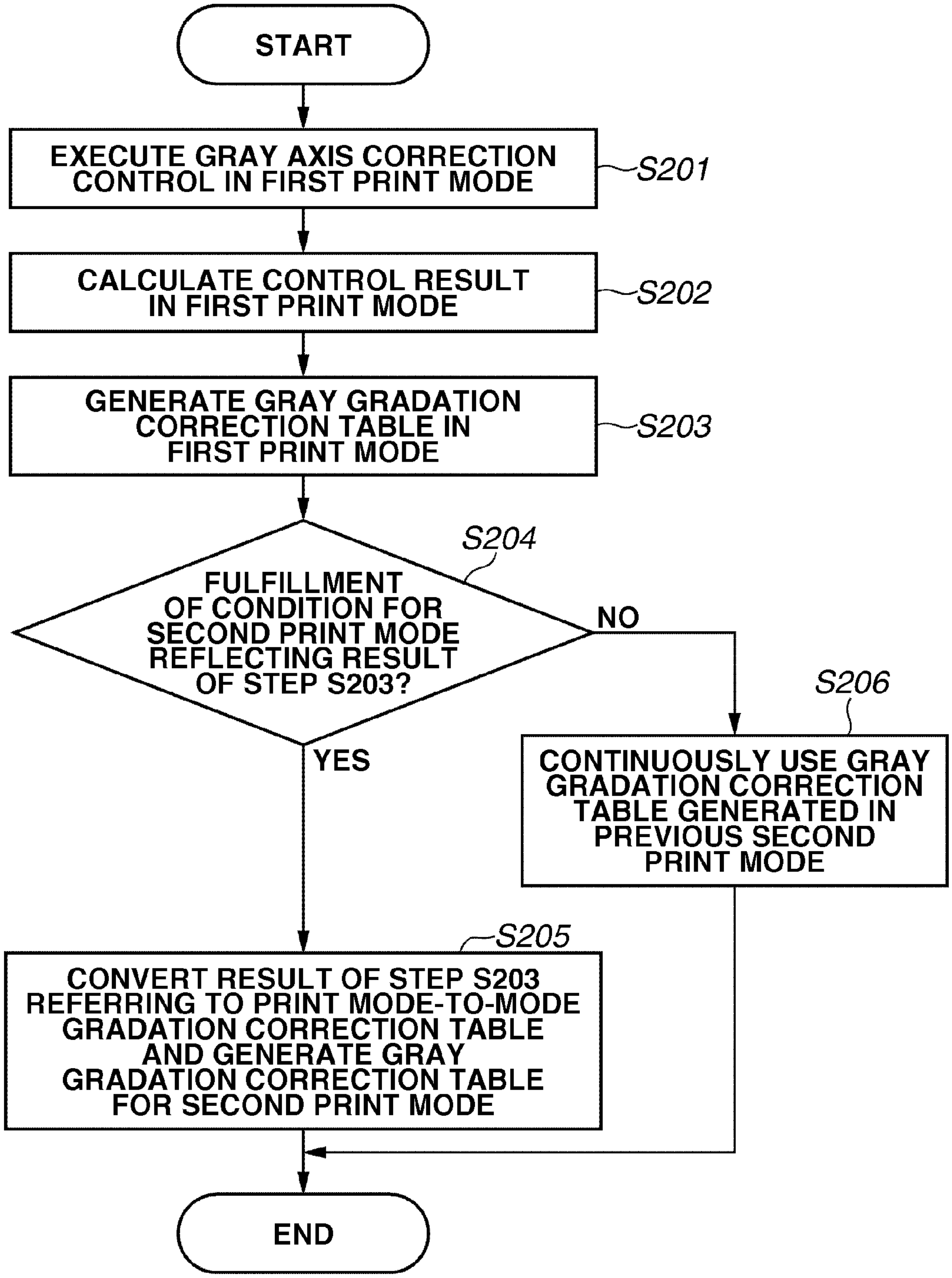
FIG. 23 is a flowchart illustrating example gray axis correction control including correction for a print mode other than the designated print mode.

FIG. 23 is a flowchart illustrating example gray axis correction control according to the fourth exemplary embodiment. The flowchart illustrated in FIG. 23 is a flowchart illustrating details of the processing in step S136 of FIG. 19 and step S236 of FIG. 21. In FIG. 23, the first print mode is an arbitrary print mode of the color image forming apparatus designated by a user and the second print mode is different from the first print mode. In the flowchart illustrated in FIG. 23, the CPU 306 executes processing of steps S204 to S206 for each of a plurality of print modes other than the first print mode executed in step S201.

In step S201, the CPU 306 executes gray axis correction control in the first print mode by executing processing similar to that (steps S114 through S117 in FIG. 6) of the first exemplary embodiment. In step S202, the CPU 306 calculates a control result in the first print mode. In step S203, the CPU 306 calculates color (gray gradation) correction tables corresponding to the first print mode. In step S204, the CPU 306 determines whether conditions for the second print mode reflecting the result of step S203 are fulfilled. The second print mode is one or more print modes (media types) different from the first print mode used in step S201 to form process gray patches on a paper for the gray axis correction control.

FIG. 24 illustrates example determination conditions in step S204. The information illustrated in FIG. 24 is stored beforehand in a memory, which is readable by the CPU 306 of the color image forming apparatus. An exemplary embodiment sets the following conditions:

1: non-execution of gray axis correction control in the past;

2: elapse of predetermined time after last gray axis correction control; and

3: replacement of parts for the color image forming apparatus after last gray axis correction control. The above-described conditions 1 and 2 can be determined for each print mode (media type).

If the CPU 306 determines that the conditions for the second print mode reflecting the result of step S203 are not fulfilled (NO in step S204), the processing proceeds to step S206. In step S206, the CPU 306 continuously uses the color correction tables generated in the previous second print mode for the printing. If the CPU 306 determines that the conditions for the second print mode reflecting the result of step S203 are fulfilled (YES in step S204), the processing proceeds to step S205.

In step S205, the CPU 306 converts the gray axis correction control result in the first print mode into a predicted result in the second print mode with reference to information (gradation-density characteristics) of respective colors between the standard print mode and other print mode stored beforehand in the ROM 310. Then, the CPU 306 generates color correction tables for the second print mode.

Figure 26:
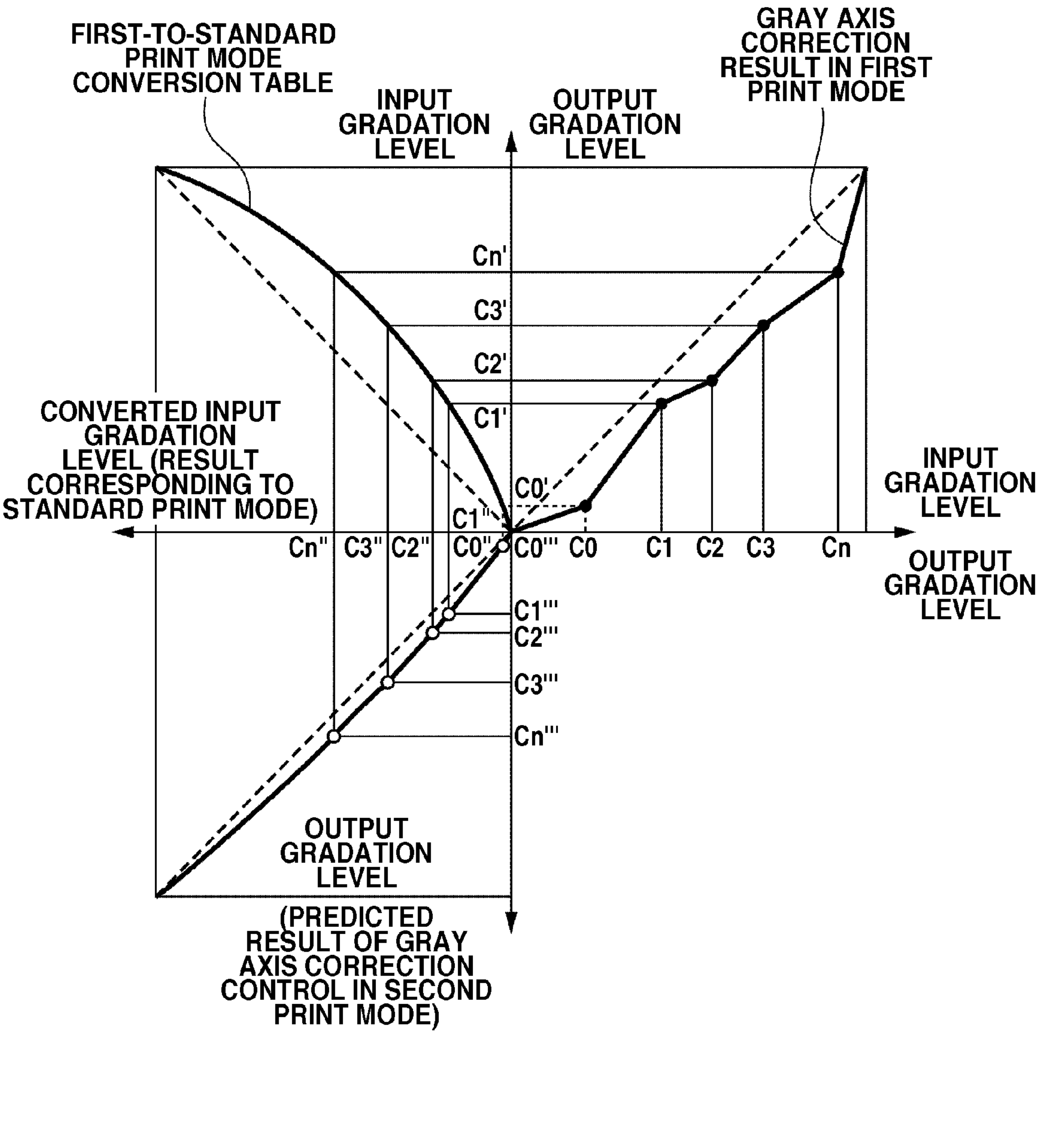
FIG. 26 illustrates a method for predicting gray axis correction control result in a target print mode based on gray axis correction control result in other print mode.

FIG. 26 is a graph illustrating a method for predicting gray axis correction control result in the second print mode based on gray axis correction control result in the first print mode. The first quadrant of FIG. 26 illustrates gray axis control result in the first print mode. The CPU 306 obtains output gradation levels (C0', C1', C2', . . . , and Cn') corresponding to input gradation levels (C0, C1, C2, . . . , and Cn). The CPU 306 converts the print mode control result in the first print mode into a result in the standard print mode as illustrated in the second quadrant. The CPU 306 obtains converted input gradation levels (C0", C1", C2", . . . , and Cn') from the output gradation levels (C0', C1', C2', . . . , and Cn').

The conversion table used for the conversion is a table defining gradation levels to attain the similar density in respective print modes. Then, the CPU 306 converts the result in the standard print mode into a result in the second print mode as illustrated in the third quadrant. The CPU 306 obtains output gradation levels (C0'", C1'", C2'", . . . , and Cn'") converted from the converted input gradation levels (C0", C1", C2", . . . , and Cn"). The graph illustrated in FIG. 26 can be prepared for each of combinations of print modes if there are three or more print modes, although not described in detail.

Figure 25:
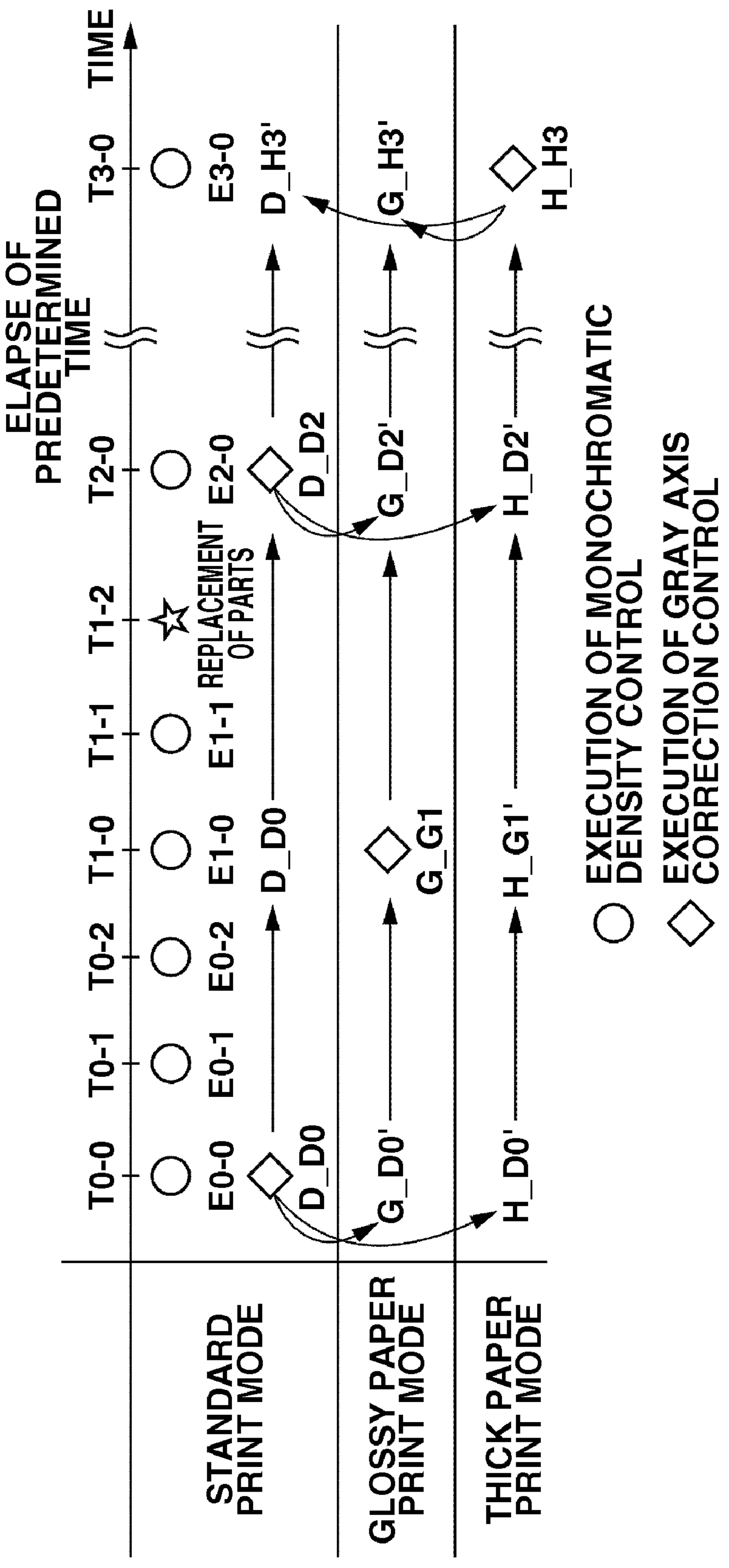
FIG. 25 illustrates example sequence of gray axis correction control including correction for other print mode.

FIG. 25 illustrates an example sequence of gray axis correction control performed in the fourth exemplary embodiment. In the following description, the first print mode is standard print mode and the second print mode is glossy paper print mode or thick paper print mode. In FIG. 25, the lateral direction represents time, ○ indicates execution time of monochromatic density control, and ◇ indicates execution time of gray axis correction control in each print mode. The fourth exemplary embodiment performs only the monochromatic density control for the standard print mode and generates density correction tables corresponding to the standard print mode. In FIG. 25, the mark position indicates execution of gray axis correction control in each print mode.

(1) Time T0-0:

The exemplary embodiment performs both monochromatic density control and gray axis correction control in the standard print mode, and reflects a color correction table (D_D0) of the standard print mode to tables (G_D0') and (H_D0') in the glossy paper print mode and the thick paper print mode, referring to print mode-to-mode gradation correction tables, as indicated by arrows in the drawing. It is assumed that, before time T0-0, the exemplary embodiment did not perform gray axis correction control in each print mode.

If the print mode is set to the standard print mode in ordinary print processing, the exemplary embodiment multiplies the color correction table D_D0 by density correction table E0-0 obtained in the latest monochromatic density control to form a mixture table and performs image formation based on the mixture table. If the print mode is set to the glossy paper print mode in ordinary print processing, the exemplary embodiment performs image formation based on a mixture table obtained by multiplying G_D0' by E0-0.

(2) Times T0-1 and T0-2:

The exemplary embodiment performs only the monochromatic density control in the standard print mode. In this case, the exemplary embodiment updates the density correction table (E0-1) and the mixture table of each print mode.

(3) Time T1-0:

The exemplary embodiment performs monochromatic density control in the standard print mode and performs gray axis correction control in the glossy paper print mode. In this case, according to the condition determination in step S204 of FIG. 23, the exemplary embodiment updates the color correction table (H_G1') only for the thick paper print mode having not been subjected to the gray axis correction control. More specifically, based on the color correction table (G_G1) of the glossy paper print mode and the print mode-to-mode gradation correction table, the exemplary embodiment updates the color correction table (H_G1') of the thick paper print mode.

(4) Time T1-2:

A user replaces cartridge(s), intermediate transfer member, fixing unit, or any other part(s) relating to image formation. The image forming apparatus recognizes replacement of parts based on detection result of sensors configured to detect attachment/detachment of the parts.

(5) Time T2-0:

The exemplary embodiment performs both monochromatic density control and gray axis correction control in the standard print mode. In this case, according to the condition determination in step S204 of FIG. 23, namely as the parts of the image forming apparatus are replaced, similar to the processing at time T0-0, the exemplary embodiment reflects the color correction table (D_D2) of the standard print mode to the tables of other print modes with reference to the print mode-to-mode gradation correction tables. More specifically, as indicated by arrows in the drawing, the exemplary embodiment reflects the color correction table (D_D2) to the tables (G_D2') and (H_D2') of the glossy paper print mode and the thick paper print mode. The above-described processing corresponds to the third condition illustrated in FIG. 24.

(6) Time T3-0:

The exemplary embodiment performs monochromatic density control in the standard print mode and performs gray axis correction control in the thick paper print mode. In this case, as illustrated in FIG. 25, as a constant time has elapsed after time T2-0, the exemplary embodiment once resets the execution history of gray axis correction controls having been performed, according to the condition determination in step S204 illustrated in FIG. 23. Then, the exemplary embodiment reflects thick paper print mode result (H_H3) to tables (D_H3') and (G_H3') of the standard print mode and the glossy paper print mode.

As described above, the fourth exemplary embodiment can predict gray axis correction control result in other print mode (corresponding to second media) based on gray axis correction control result in the first print mode (corresponding to first media). Thus, the fourth exemplary embodiment can obtain adequate color reproducibility in each print mode without performing gray axis correction control in all print modes.

The first through fourth exemplary embodiments indirectly specify a media type based on print mode information received from the printer controller 302 instructed by a user, and executes the processing of steps S133 to S136 illustrated in FIG. 19. However, the present invention is not limited to the above-described embodiments.

An exemplary embodiment directly detects media type information included in print mode information and performs processing similar to that described in the above-described exemplary embodiments based on detection result. In this case, the media sensor 70 illustrated in FIG. 1 detects a media type of papers. The exemplary embodiment specifies a media type based on detection result obtained by the media sensor 70. The exemplary embodiment correlates the specified media type with the standard print mode or the glossy print mode described in the first exemplary embodiment.

In this case, if the media type specified by the media sensor 70 is plain paper, the exemplary embodiment regards the specified media type as standard print mode. If the media type specified by the media sensor 70 is glossy paper, the exemplary embodiment regards the specified media type as glossy paper print mode. Although not described in detail, after the print mode is specified, the exemplary embodiment performs processing similar to that described in the above-described exemplary embodiments.

A sixth exemplary embodiment provides a paper information input unit that enables a user to input information relating to a paper used for color stabilization control, instead of using a media sensor. The sixth exemplary embodiment differs from the first through fifth exemplary embodiments in that the number of patches and the image size of each patch included in a test image are changeable. The sixth exemplary embodiment uses a test image illustrated in FIG. 29. The rest of the features of the sixth exemplary embodiment are similar to those described in the first through fifth exemplary embodiments.

Figure 27:
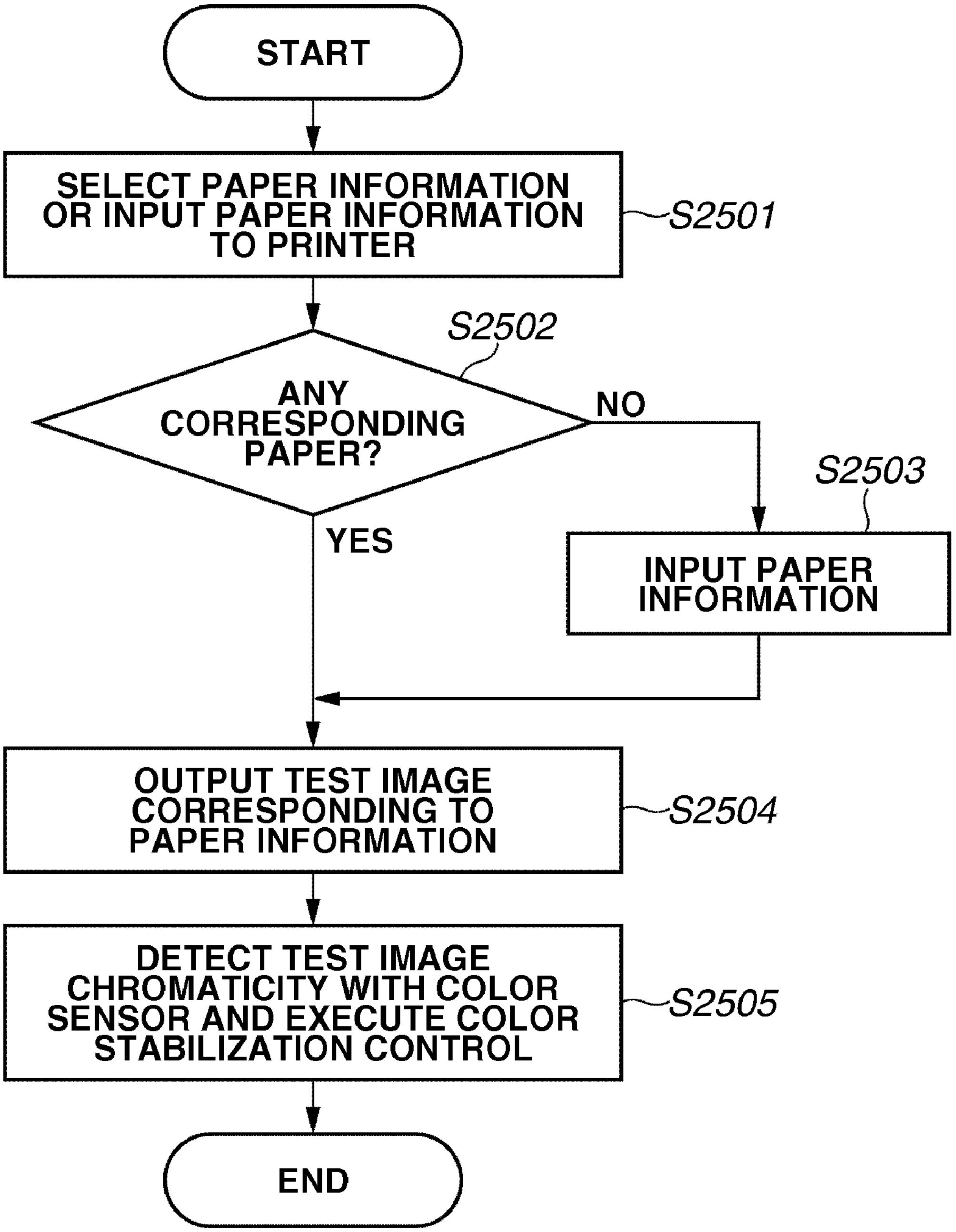
FIG. 27 is a flowchart illustrating example gray axis correction control according to another exemplary embodiment.

FIG. 27 is a flowchart illustrating example color stabilization control performed by the CPU 306 according to the sixth exemplary embodiment. In step S2501, the CPU 306 enables a user to select paper information for the color stabilization control or input paper information into a printer via a user interface illustrated in FIG. 28, which is displayed on a monitor of the host computer 301 or on an operation panel 303 of a printer. According to the color image forming apparatus according to the above-described exemplary embodiment, a user can manually select paper information for the color stabilization control via the operation panel 303 illustrated in FIG. 2.

Figure 28:
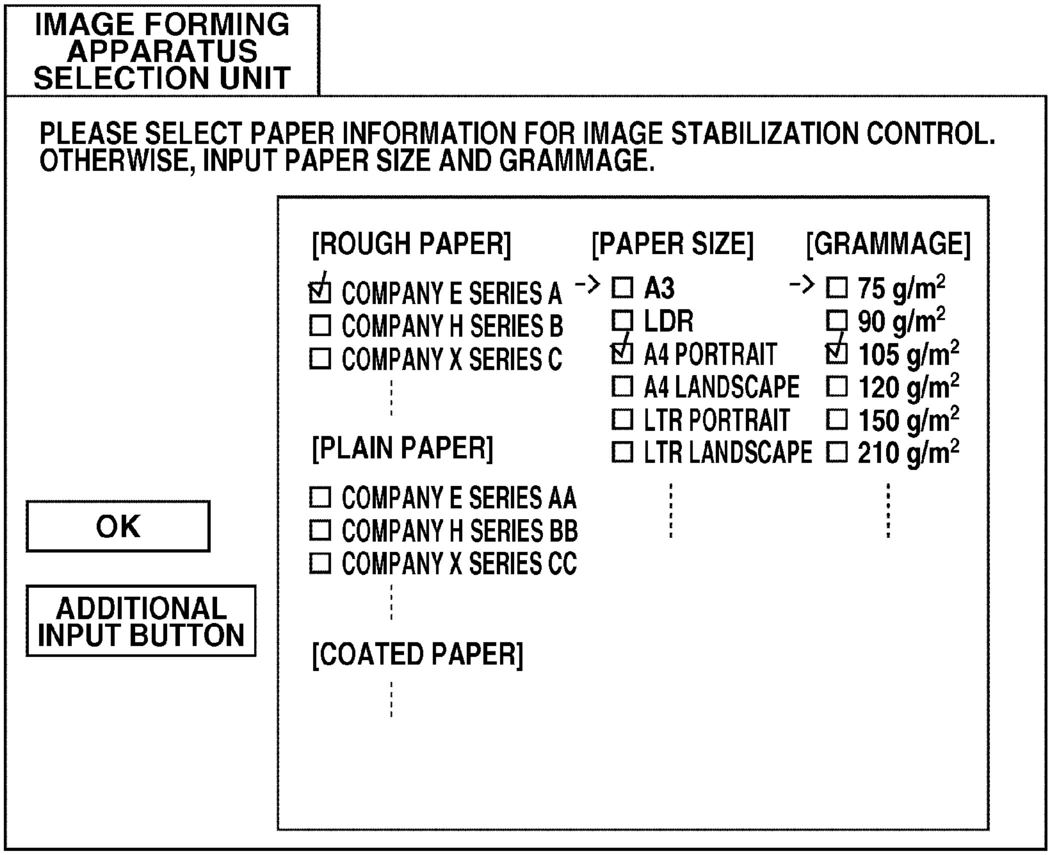
FIG. 28 illustrates an example user interface that enables a user to input paper information.

The user interface illustrated in FIG. 28 enables a user to select items in the following three categories. The first category relates to paper type, which is classified into rough paper, plain paper, and coated paper according to surface roughness. The second category relates to paper size, such as A3, A4, Letter (LTR), and Ledger (LDR) as well as paper conveyance direction in the color image forming apparatus. The third category relates to paper weight (grammage) per unit area.

If in step S2502 the CPU 306 determines that there is an appropriate selection item, the processing proceeds to step S2504. On the other hand, if in step S2502 the CPU 306 determines that there is no appropriate selection item, the processing proceeds to step S2503. In step S2503, the CPU 306 enables a user to input necessary information, such as paper size and grammage (the above-described first through third paper information), via an appropriate input device (not illustrated). Then, in step S2504, the CPU 306 causes the image forming unit 307 to output a test image according to the input paper information.

In this case, as described in the first through fourth exemplary embodiments, the image forming unit 307 generates a plurality of test images according to a plurality of CMYK gradation combinations based on the image forming condition (print mode/media type). Then, the image forming unit 307 generates test images according to the paper information received in step S2501, so as to comply with regulations stored beforehand in a memory area (not illustrated) of the image forming apparatus.

Figure 29:
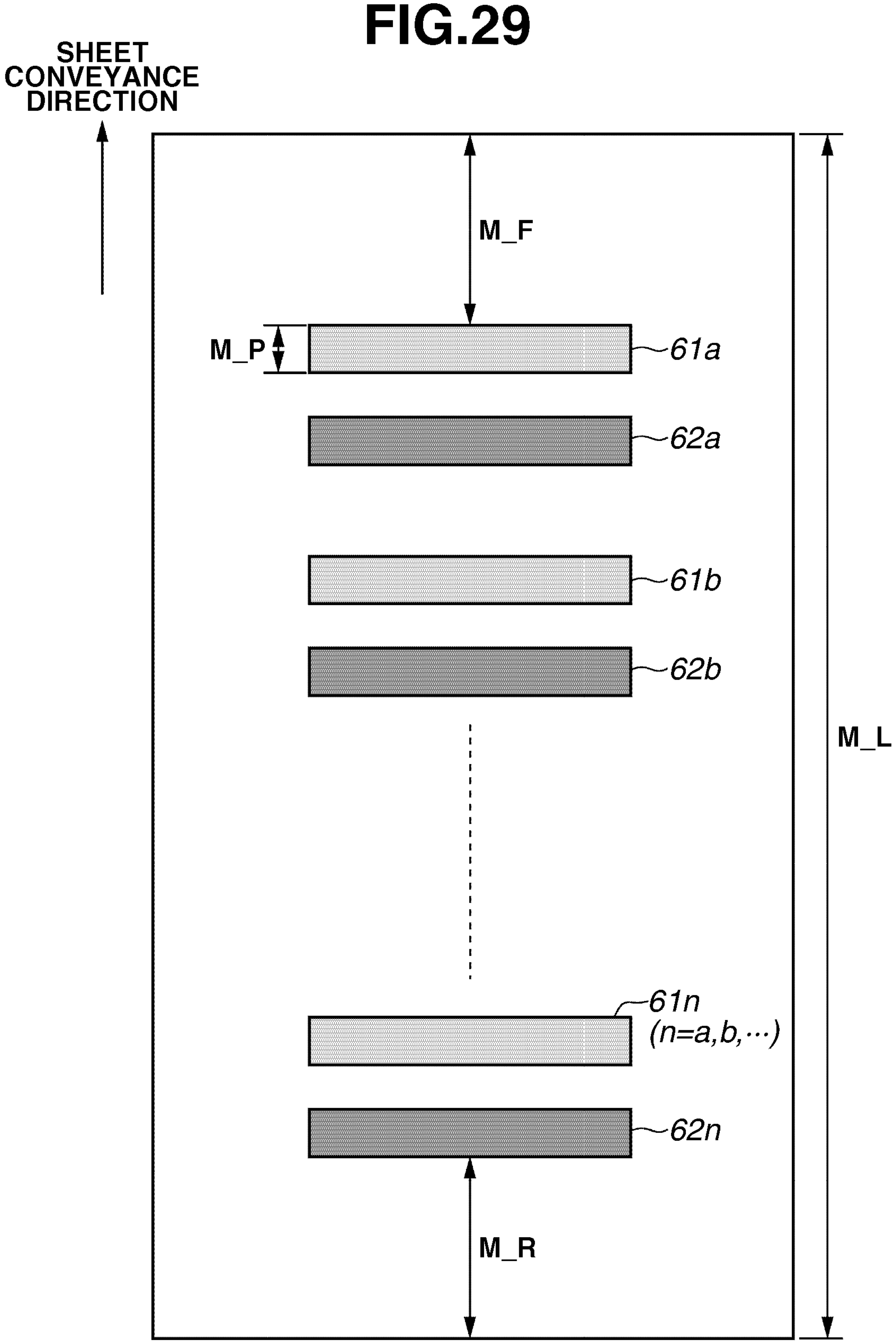
FIG. 29 illustrates an example test image.

FIG. 29 illustrates an example test image for the color stabilization control, which is output from the color image forming apparatus according to an exemplary embodiment. The test image includes a plurality of gradation patch patterns of gray (i.e., most important color in color balance). Gray gradation patches 61*a*, 61*b*, . . . , and 61*n* are monochromatic patches made of black (K) only. Gray gradation patches 62*a*, 62*b*, and 62*n* are process gray patches made of mixed colors of yellow (Y), magenta (M), and cyan (C). Gray gradation patches 61*a* and 62*a* are paired as patches having similar chromaticity. Similarly, gray gradation patches 61*b* and 62*b*, 61*c* and 62*c*, . . . , and 61*n* and 62*n* are paired as patches having similar chromaticity.

As illustrated in FIG. 29, "M_L" represents the length of a paper in the paper conveyance direction, "M_F" represents a gap between the top of the paper and the first patch 61*a*, and "M_P" represents the length of each patch. Furthermore, "M_R" represents a gap between the final patch 62*n* (n=a, b, c, . . . ) and the bottom of the paper, and "n" represents the total number of patches.

An exemplary embodiment changes the number of patches and the image size of each patch included in a test image according to the paper information received in step S2501, in addition to the print mode-to-mode gradation corrections described in the first through fourth exemplary embodiment. FIG. 30 illustrates an example combination table describing conditions for a test image used in the color stabilization control considering three items (paper type, paper size, and grammage) selected in step S2501.

First, the exemplary embodiment determines an image size of each patch suitable for a selected paper type. Next, the exemplary embodiment determines a test image printable area based on a combination of paper size and grammage. Then, the exemplary embodiment determines the number of patches to be included in a test image (i.e., n gray gradation patches and n process gray patches) with reference to the relationship between the test image printable area and the image size of each patch. In an exemplary embodiment, the number of patches and the image size of each patch included in a test image are defined in the paper conveyance direction of a color image forming apparatus.

For example, when the paper type is plain paper, the paper size is A4 landscape, and the grammage is 80 g/m$^2$, the size of each patch according to the exemplary embodiment is 12 mm, the test image printable area is 180 mm, and the maximum number of patches included in the test image is 15. The test image according to the exemplary embodiment includes black (K) gray gradation patches (61*a*, 61*a*, 61*b*, . . . , and 61*n*) and process gray gradation patches (62*a*, 62*b*, . . . , and 62*n*), which are arranged in a plurality of pairs. Therefore, if the maximum number is an odd number, the number of patches actually formed is equal to the largest even number smaller than the maximum number.

The above-described exemplary embodiment takes the following factors into consideration in determining the test image forming conditions illustrated in FIG. 30. The reason why the image size of each patch is determined according to the paper type is that a paper having a rough and uneven surface has poor repetitive reproducibility in color sensor output. To prevent reduction in the repetitive reproducibility, the above-described exemplary embodiment enlarges the image size and increases the number of detections of each patch by the color sensor, to successfully perform averaging processing.

Furthermore, the present exemplary embodiment divides the test image print area into two areas according to the grammage of paper. According to the above-described exemplary embodiment, the test image print area for a paper having the grammage equal to 160 g/m$^2$ or greater is set larger compared to an ordinary size. In general, the rigidity of a paper has adverse effects on the color sensor output because a rigid paper causes a vibratory or springback motion at the color sensor position when a leading paper edge enters a nip portion of the recording medium conveyance roller 13 and when a trailing paper edge exits the nip portion of the roller 12.

In step S2505, the CPU 306 detects chromaticity of the test image with the color sensor and performs color stabilization control.

The processing in this step is dependent on the above-described print mode/media type and is similar to those in the first through fourth exemplary embodiments, although not described in detail.

As described above, the color image forming apparatus according to an exemplary embodiment includes paper information input unit that enables a user to input information relating to a paper used for color stabilization control. The color image forming apparatus changes the number of patches and image size of each patch included in a test image based on the input paper information, and performs color stabilization control. Thus, an exemplary embodiment can reduce variation in the distance between the color sensor and a test image that may occur due to differences in conveyance property of recording media and can stabilize output of the color sensor.

Furthermore, the exemplary embodiment can accurately detect toner chromaticity irrespective of the state of recording medium without using a new device and can provide a color image forming apparatus having appropriate color stability. Furthermore, the exemplary embodiment can accurately execute tint correction with the color sensor described in the first through fourth exemplary embodiments. The exemplary embodiment can be applied to an apparatus that fixes CMYK gradations to form patches irrespective of the type of print mode/media.

The paper information input unit according to the above-described exemplary embodiment is not limited to an operation panel of an image forming apparatus. For example, a printer driver screen displayed on a host computer connected directly or via a network to the image forming apparatus can be used as paper information input unit. Furthermore, the above-described exemplary embodiment changes the number of patches and image size of each patch included in a test image according to the surface roughness and grammage of a recording medium.

However, the size of each patch can be changed according to only the paper conveyance speed or according to a combination of paper conveyance speed and paper surface roughness. For example, when the paper conveyance speed is half of the ordinary speed, if the sampling interval of a color sensor remains the same, a patch size required for averaging processing is reduced to a half level.

Furthermore, software (program code) for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments.

In this case, the program code itself can realize the functions of the exemplary embodiments. The equivalents of programs can be used if they possess comparable functions. In this case, the type of program can be any one of object code, interpreter program, and OS script data. Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disc—ROM (CD-ROM), a CD-recordable (CD-R), a CD-rewritable (CD-RW), a magnetic tape, a nonvolatile memory card, a ROM, and a DVD (DVD-ROM, DVD-R).

The program code according to the present invention can cooperate with an operating system (OS) or other application software running on a computer to realize the functions of the above-described exemplary embodiments.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A color image forming apparatus, comprising:

a forming unit configured to form a plurality of mixed color patches that are different in a combination of gradation levels of a plurality of colors, the colors comprising yellow, magenta and cyan and to form a black patch;

a detector configured to detect color of the plurality of mixed color patches and the black patch fixed on a transfer material by the forming unit;

a calculator configured to obtain the gradation levels of yellow, magenta and cyan so that the color of each mixed color patch detected by the detector becomes similar to color of a corresponding black color of the black patch; and a specifying unit configured to specify an image forming condition related with a type of the transfer material or a type of print mode, wherein the forming unit forms the mixed color patches based on a first combination of gradation levels of yellow, magenta and cyan if the image forming condition specified is a first image forming condition, and the forming unit forms the mixed color patches based on a second combination of gradation levels of yellow, magenta and cyan different from the first combination of gradation levels of yellow, magenta and cyan if the image forming condition specified is a second image forming condition, wherein a color detection result of the mixed color patches formed by the first combination of gradation levels is able to encompass the corresponding black color on a color space, and a color detection result of the mixed color patches formed by the second combination of gradation levels is able to encompass the corresponding black color on a color space.

2. The color image forming apparatus according to claim 1, further including a storage unit configured to store the first combination of gradation levels of yellow, magenta and cyan, and the second combination of gradation levels.

3. The color image forming apparatus according to claim 1, further comprising a conversion table corresponding to the image forming condition, wherein a conversion table corresponding to the second image forming condition is used to generate the second combination of gradation levels of yellow, magenta and cyan.

4. The color image forming apparatus according to claim 1, wherein the calculator calculates a color correction table of another image forming condition based on calculation result obtained by the calculator according to the first or second image forming condition.

5. The color image forming apparatus according to claim 1, wherein, if a specific condition is fulfilled, a calculator calculates a color correction table of another image forming condition based on the calculation result obtained by the calculator according to the first or second image forming condition.

6. A color adjustment method for a color image forming apparatus comprising a forming unit configured to form a plurality of mixed color patches that are different in a combination of gradation levels of a plurality of colors, the colors comprising yellow, magenta and cyan and to form a black patch, a detector configured to detect color of the plurality of mixed color patches fixed on a transfer material by the forming unit, and a calculator configured to obtain the gradation levels of yellow, magenta and cyan so that the color of each mixed color patch detected by the detector becomes similar to color of a corresponding black color of the black patch, the method comprising:

specifying an image forming condition related with a type of the transfer material or a type of print mode;

causing the forming unit to form the mixed color patches based on a first combination of gradation levels of yellow, magenta and cyan if the specified image forming condition is a first image forming condition; and causing the forming unit to form the mixed color patches based on a second combination of gradation levels of yellow, magenta and cyan different from the first combination of gradation levels of yellow, magenta and cyan if the specified image forming condition is a second image forming condition, wherein a color detection result of the mixed color patches formed by the first combination of gradation levels is able to encompass the corresponding black color on a color space, and a color detection result of the mixed color patches formed by the second combination of gradation levels is able to encompass the corresponding black color on a color space.

* * * * *